(12) United States Patent
Chen et al.

(10) Patent No.: US 9,319,136 B2
(45) Date of Patent: Apr. 19, 2016

(54) OPTICAL DISPERSION COMPENSATION DEVICES

(71) Applicant: RANOVUS INC., Toronto (CA)

(72) Inventors: Rong Chen, Kanata (CA); Douglas J. S. Beckett, Kanata (CA); Dylan Logan, Ottawa (CA)

(73) Assignee: RANOVUS INC., Ottawa, Ontario (CA)

( * ) Notice: Subject to any disclaimer, the term of this patent is extended or adjusted under 35 U.S.C. 154(b) by 73 days.

(21) Appl. No.: 14/259,647

(22) Filed: Apr. 23, 2014

(65) Prior Publication Data

US 2015/0311978 A1 Oct. 29, 2015

(51) Int. Cl.
*H04B 10/275* (2013.01)
*G02B 6/293* (2006.01)
*H04B 10/2513* (2013.01)
*H04B 10/2507* (2013.01)

(52) U.S. Cl.
CPC .......... *H04B 10/2507* (2013.01); *G02B 6/2934* (2013.01); *G02B 6/29343* (2013.01); *G02B 6/29394* (2013.01); *G02B 6/29395* (2013.01); *H04B 10/2513* (2013.01); *H04B 10/275* (2013.01)

(58) Field of Classification Search
CPC ............. H04B 10/2513; G02B 6/2934; G02B 6/29343
See application file for complete search history.

(56) References Cited

U.S. PATENT DOCUMENTS

| 6,865,314 | B1 * | 3/2005 | Blair ...................... B82Y 20/00 385/15 |
| 2002/0176659 | A1 | 11/2002 | Lei et al. | |
| 2002/0181878 | A1 | 12/2002 | Schneider et al. | |
| 2003/0179972 | A1 | 9/2003 | Gerlach et al. | |
| 2005/0013537 | A1 | 1/2005 | Yamazaki | |
| 2007/0292079 | A1 * | 12/2007 | Jones ................. G02B 6/29352 385/27 |

OTHER PUBLICATIONS

Takahashi et al., "Analysis of negative group delay response of all-pass ring resonator with Mach-Zehnder interferometer," in Photonics Technology Letters, IEEE, vol. 16, No. 9, pp. 2063-2065, Sep. 2004; doi: 10.1109/LPT.2004.832603; URL: http://ieeexplore.ieee.org/stamp/stamp.jsp?tp=&arnumber=1325233&isnumber=29327.*
Takahashi, Hidenori, et al., "Expansion of Bandwidth of Tunable Dispersion Compensator Based on Ring Resonators Utilizing Negative Group Delay", Journal of Lightwave Technology, vol. 24, No. 6, Jun. 2006, IEEE.

(Continued)

*Primary Examiner* — Nathan Curs
(74) *Attorney, Agent, or Firm* — Perry + Currier, Inc.

(57) ABSTRACT

Optical dispersion compensation devices are provided herein that are based on one or more optical ring resonators. The degree of dispersion compensation can be selected by controlling the degree of under-coupling and by tuning physical properties of the optical ring resonators. In a first implementation, an optical ring resonator under-coupled to an optical throughput bus can be used to provide positive or negative dispersion compensation depending on tuning of the optical ring resonator, which widens the dispersion window. In a second implementation, an over-coupled optical ring resonator can be added to the optical throughput bus to provide a cascaded filter. In a third implementation optical ring resonators arranged in series between an optical input bus and an optical output bus can be used to both tune dispersion compensation and provide demultiplexing.

36 Claims, 19 Drawing Sheets

(56) References Cited

OTHER PUBLICATIONS

Madsen, C.K., et al., "Multistage Dispersion Compensator Using Ring Resonators", Optics Letters, Optical Society of America, vol. 24, No. 22, Nov. 15, 1999.

Gupta, G., et al., "Cascaded Over- and Under-Coupled Resonators (COUR): Reducing Group Delay Dispersion and Overcoming the Sensitivity-Bandwidth Trade-off", Optical Society of America, 2008.
Corresponding European Patent Application No. 15164485.3 dated Jul. 6, 2015.

* cited by examiner

OPTICAL DISPERSION COMPENSATION DEVICES

FIELD

The specification relates generally to telecommunication devices, and specifically to optical dispersion compensation devices.

BACKGROUND

Dispersion is a problem in optical telecommunication systems, as pulse broadening due to dispersion of an optical signal travelling over an optical fiber leads to data loss, and/or poor signal to noise ratios in the optical signal. Fixed dispersion compensation modules (DCMs) based on dispersion spools, fiber Bragg gratings, etc., can shift the dispersion window but not open up the dispersion window. Further, fixed DCM solutions introduce errors that can quickly use up the dispersion window. The cost of such solutions can also be quite high.

SUMMARY

The present specification provides optical dispersion compensation devices based on one or more optical ring resonators, which can be tuned. Physical properties and coupling of the one or more optical ring resonators to one or more of an optical throughput/input bus, an optical output bus, and each other are selected to provide a tradeoff between dispersion compensation and insertion loss. Generally, coupling and physical properties of the rings, such as index of refraction and/or temperature, are selected so that a dispersion peak of the one or more optical ring resonators is about aligned with an optical carrier frequency of an optical signal, and a centre of a corresponding insertion loss peak (where loss is usually the highest) of the one or more optical ring resonators is selected to be different from the optical carrier frequency. The one or more optical ring resonators can be arranged along the optical throughput/input bus. In some of these implementations an optical ring resonator for each optical carrier frequency for which dispersion compensation is to occur is under-coupled to the optical throughput/input bus. In other implementations a pair of optical ring resonators for each optical carrier frequency for which dispersion compensation is to occur is coupled to the optical throughput/input bus, one of the optical ring resonators in the pair being under-coupled while the other is over-coupled; each can be tuned to, in turn, tune combined dispersion compensation. Alternatively, two or more rings can be arranged in series between the optical throughput/input bus and an output bus to further provide demultiplexing of channels on the optical throughput/input bus. In each solution a position of a dispersion peak can be tuned to align with the optical carrier frequency to provide either a substantially positive dispersion compensation at the optical carrier frequency or a substantially negative dispersion compensation at the optical carrier frequency.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the present specification provides a device comprising: an optical input bus configured to convey a given optical input signal having a given optical carrier frequency and a given data rate; an optical output bus; and, an optical ring resonance structure comprising one or more optical ring resonators arranged between the optical input bus and the optical output bus, physical properties and coupling of the optical ring resonance structure to the optical input bus, the optical output bus, and between the one or more optical ring resonators selected so that: a centre of an insertion loss profile of the optical ring resonance structure is between the given optical carrier frequency and a first minimum of the given optical input signal, the insertion loss profile having a bandwidth at least about two thirds of the given data rate, so that a side band of the given optical input signal dominates an optical output signal conveyed from the optical input bus to the optical output bus; and, a dispersion peak of the optical ring resonance structure about aligns with the given optical carrier frequency.

The optical ring resonance structure can comprise a first optical ring resonator and a second optical ring resonator arranged in series between the optical input bus and the optical output bus, the first optical ring resonator coupled to the optical input bus, and the second optical ring resonator coupled to the optical output bus.

The bandwidth of the insertion loss profile can exclude other given optical signals, adjacent to the given optical signal, that can also be conveyed on the optical input bus, the other given optical signals and the given optical signal each comprising a data channel on the optical input bus.

A portion of an edge of the insertion loss profile can be one or more of: intersecting a respective edge of the given optical signal; and is about aligned with the respective edge of the given optical signal, the respective edge of the given optical signal between the given optical carrier frequency and the first minimum of the given optical input signal.

The physical properties and the coupling of the optical ring resonance structure to the optical input bus, the optical output bus, and between the one or more optical ring resonators can be further selected so that dispersion compensation of the dispersion peak is between either: about 150 ps/nm and to about 300 ps/nm; or about −150 ps/nm and to about −300 ps/nm.

The physical properties and the coupling of the optical ring resonance structure to the optical input bus, the optical output bus, and between the one or more optical ring resonators can be further selected so that insertion loss due to the insertion loss profile is between about 1 dB and about 7 dB.

The device can further comprise an optical input device connected to the optical input bus, the optical input device configured to receive an optical fiber, the optical fiber configured to convey the given optical input signal to the optical input bus.

The device can further comprise an optical output device connected to the optical output bus, the optical output device configured to convey the optical output signal to one or more of: an optical fiber and an optical receiver.

The one or more optical ring resonators can be arranged in series via one or more drop ports.

The device can further comprise a plurality of optical ring resonance structures and a plurality of optical output buses, in a one to one relationship, each of the plurality of optical ring resonance structures coupling the optical input bus to a respective optical output bus, of the plurality of optical output buses, each of the plurality of optical ring resonance structures tuned to a different optical carrier frequency.

The device can further comprise a plurality of optical output devices connected to respective optical output buses, the plurality of optical output devices configured to convey respective optical output signals to one or more of: an optical fiber and an optical receiver.

The device can further comprise an optical receiver in communication with the optical output bus.

The device can further comprise a tuning apparatus configured to tune the optical ring resonance structure. The tuning apparatus can be configured to tune the physical properties of optical ring resonance structure. The tuning apparatus can be configured to control a temperature of the optical ring resonance structure, and the tuning apparatus can comprise one or more of: a temperature control apparatus, a heater, a cooler, and a thermoelectric cooler.

Another aspect of the specification comprises a device comprising: an optical throughput bus configured to convey a given optical input signal having a given optical carrier frequency; and, an optical ring resonator under-coupled to the optical throughput bus, the under-coupling and physical properties of the optical ring resonator selected so that: a dispersion peak of the optical ring resonator about aligns with the given optical carrier frequency; and, a centre of an insertion loss profile of the optical ring resonator is different from the given optical carrier frequency.

The bandwidth of the insertion loss profile can exclude other given optical signals, adjacent in optical carrier frequency to the given optical signal, that can also be conveyed on the optical throughput bus, the other given optical signals and the given optical signal each comprising a data channel on the optical throughput bus.

The physical properties and the under-coupling of the optical ring resonator to the optical throughput bus can be further selected so that dispersion compensation of the dispersion peak is between either: about 150 ps/nm and to about 300 ps/nm; or about −150 ps/nm and to about −300 ps/nm.

The physical properties and the under-coupling of the optical ring resonator to the optical throughput bus can be further selected so that insertion loss due to the insertion loss profile is between about 1 dB and about 7 dB.

The device can further comprise an optical input device connected to the optical throughput bus, the optical input device configured to receive an optical fiber, the optical fiber configured to convey the given optical input signal to the optical throughput bus.

The device can further comprise an optical output device connected to the optical throughput bus, the optical output device configured to convey an optical output signal to one or more of: an optical fiber and an optical receiver.

The device can further comprise a plurality of optical ring resonators under-coupled to the optical throughput bus, each of the plurality of optical ring resonators tuned to a different optical carrier frequency.

The device can further comprise an optical receiver in communication with the optical throughput bus.

The device can further comprise a tuning apparatus configured to tune the optical ring resonator. The tuning apparatus can be configured to tune the physical properties of optical ring resonator. The tuning apparatus can be configured to control a temperature of the optical ring resonator, and the tuning apparatus can comprise one or more of: a temperature control apparatus, a heater, a cooler, and a thermoelectric cooler.

Yet a further aspect of the present specification provides a device comprising: an optical throughput bus configured to convey a given optical input signal having a given optical carrier frequency; and, a first optical ring resonator under-coupled to the optical throughput bus and a second optical ring resonator over-coupled to the optical throughout bus, respective coupling of each of the first optical ring resonator and the second optical ring resonator to the optical throughput bus, and respective physical properties thereof, selected so that: combined dispersion compensation of the first optical ring resonator and the second optical ring resonator is at a given dispersion value at the given optical carrier frequency; and, a combined insertion loss profile of the first optical ring resonator and the second optical ring resonator is at a given transmission value at the given optical carrier frequency.

Under-coupling of the first optical ring resonator to the optical throughput bus and the over-coupling of the second optical ring resonator to the optical throughput bus, and the respective physical properties, can be further selected so that the combined dispersion compensation between either: about 50 ps/nm and to about 300 ps/nm; or about −50 ps/nm and to about −300 ps/nm.

Under-coupling of the first optical ring resonator to the optical throughput bus and the over-coupling of the second optical ring resonator to the optical throughput bus, and the respective physical properties, can be further selected so that insertion loss due to the combined insertion loss profile is between about 4 dB and about 8 dB.

The device can further comprise an optical input device connected to the optical throughput bus, the optical input device configured to receive an optical fiber, the optical fiber configured to convey the given optical input signal to the optical throughput bus.

The device can further comprise an optical output device connected to the optical throughput bus, the optical output device configured to convey an optical output signal to one or more of: an optical fiber and an optical receiver.

The device can further comprise a plurality of pairs of under-coupled optical ring resonators and over-coupled optical ring resonators on the optical throughput bus, each of the plurality of pairs tuned to a different optical carrier frequency.

The device can further comprise an optical receiver in communication with the optical throughput bus.

The device can further comprise at least one tuning apparatus configured to tune one or more of the first optical ring resonator, and the second optical ring resonator.

The at least one tuning apparatus can be configured to tune respective physical properties of each of the first optical ring resonator, and the second optical ring resonator.

The at least one tuning apparatus can be configured to control a temperature of one or more of the first optical ring resonator and the second optical ring resonator, and the at least one tuning apparatus can comprise one or more of: at least one temperature control apparatus, at least one heater, at least one cooler, at least one thermoelectric cooler.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
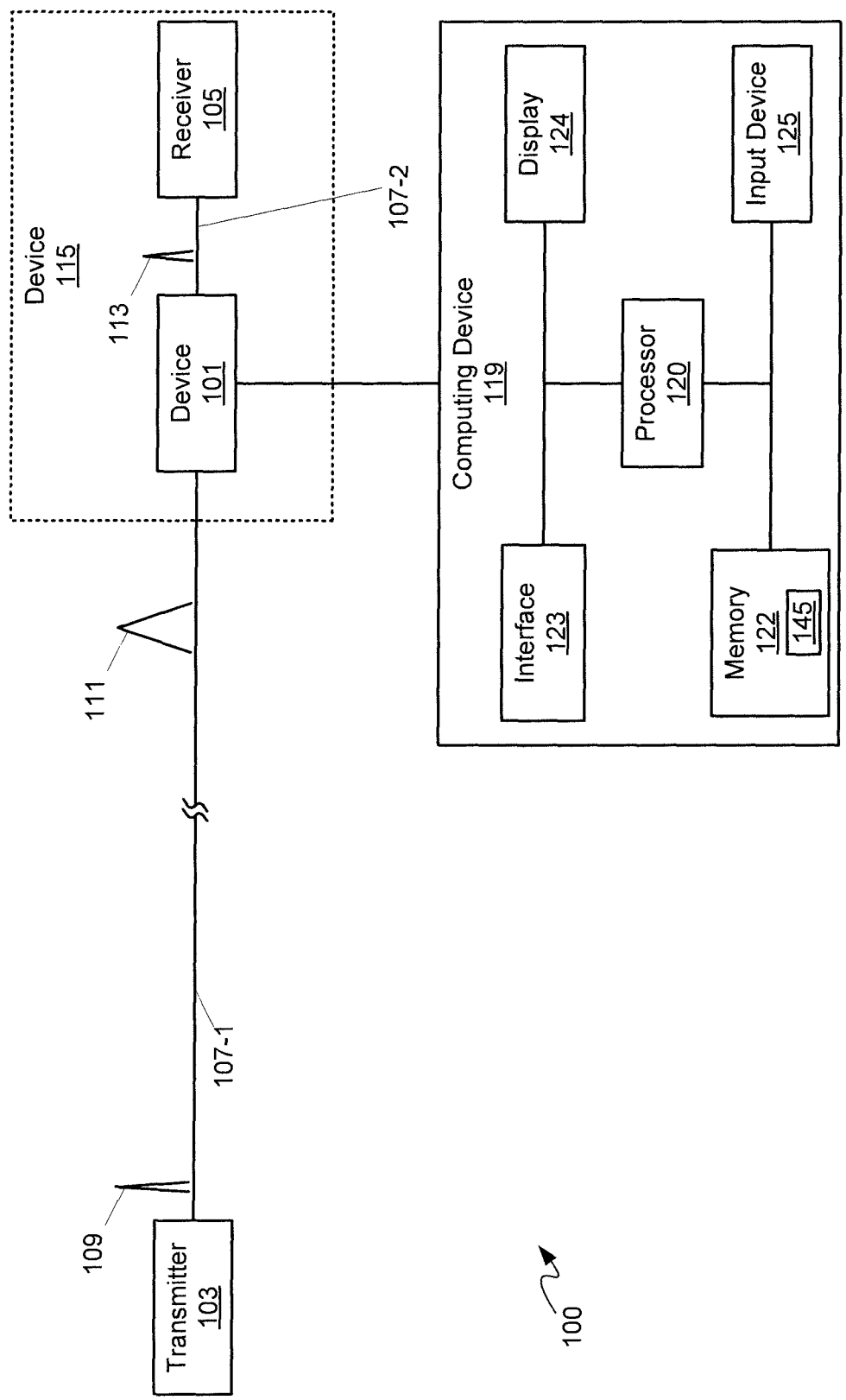
FIG. 1 depicts a schematic diagram of an optical telecommunications system, according to non-limiting implementations.

FIG. 1 depicts an optical telecommunication system 100 comprising an optical dispersion compensation device 101, an optical transmitter 103, an optical receiver 105, and at least one optical fiber 107-1, 107-2, according to non-limiting implementations, which are interchangeably referred to hereafter, respectively, as device 101, transmitter 103, receiver 105, and fiber 107-1, 107-2. In general, transmitter 103 and receiver 105 are in communication via fiber 107-1, with device 101 located between transmitter 103 and receiver 105, fiber 107-1 connecting transmitter 103 and device 101, and fiber 107-2 connecting device 101 and receiver 105. As described in further detail below, device 101 is configured to provide dispersion compensation for optical signals and/or optical carrier signals transmitted through fiber 107-1. System 100 can further comprise a computing device 119, comprising a processor 120 interconnected with a memory 122, a communication interface 123 (interchangeably referred to hereafter as interface 123), and an optional display 124, and optional input device 125. Computing device 119 is further in communication with device 101, for example to control and/or tune dispersion compensation at device 101. Memory 122 stores an application 145, which, when processed by processor 120, enables computing device 119 to control and/or tune dispersion compensation at device 101.

Transmitter 103 is generally configured to generate and transmit a modulated optical signal 109 at a given optical carrier frequency and a given data rate, optical signal 109 having data encoded therein. While optical signal 109 is transmitted at a given optical carrier frequency, data encoding causes optical signal 109 to have a frequency spread, with a central peak of the optical signal at the optical carrier frequency. In FIG. 1, optical carrier signals are depicted on an amplitude (y-axis) vs. time (x-axis) scale.

Transmitter 103 is further configured to optically interface with optical fiber, and transmitter 103 hence transmits optical signal 109 through optical fiber 107-1, which can be hundreds of kilometers long (or more). As optical signal 109 travels through optical fiber 107, dispersion occurs in optical fiber 107 transforming optical signal 109 into optical signal 111: in other words optical signal 111 comprises optical signal 109 after travelling through optical fiber 107. Hence, optical signal 111 has a time spread that is wider than a time spread of optical signal 109 due to dispersion in optical fiber 107-1. In general, such spreading in time causes inter-symbol interference (ISI) in optical signals being transmitted through an optical fiber.

As described hereafter, device 101 receives optical signal 111 prior to receiver 105, and compensates for dispersion in optical signal 111 by producing an optical output signal 113 with a compensated dispersion (and generally reduced amplitude), as compared to optical signal 111. Optical output signal 113 is transmitted to receiver 105 via fiber 107-2; receiver 105 hence receives optical output signal 113 and data therein is decoded, and one or more of converted to another signal type of for further transmission and/or converted to one or more of voice, audio, video, images, web data, browser data, and the like.

Transmitter 103 can hence comprise a modulating optical signal generator including, but not limited to, one or more lasers, one more light emitting diodes (LEDs), and the like, as well as light modulating devices, one or more interface to data generating devices, including, but not limited to, servers, personal computers, laptops, mobile devices and the like, and the like; receiver 105 can hence comprise a detector for detecting optical output signal 113, including, but not limited to, one or more photodiodes, and the like, as well as interfaces to data receiving devices, including, but not limited to, servers, personal computers, laptops, mobile devices and the like.

While not depicted, system 100 can further comprise amplifiers for amplifying optical signal 109 as optical signal 109 transmits through fiber 107-1 and/or other components, such as filters, which can add to or subtract from signal dispersion. While also not depicted, system 100 can further comprise one or more fixed DCMs (dispersion compensation modules), according to the prior art, including, but not limited to, dispersion spools, fiber Bragg gratings and the like, whose dispersion compensation properties are generally limited. For example, such fixed DCMs still leave residual dispersion which can be compensated by device 101, as described below. Furthermore, such DCMs are also inconveniently large, are high cost, and/or can have high power dissipation. Furthermore, such DCMs generally provide full band dispersion compensation rather than per-channel dispersion compensation as with device 101, as also described below. While some Fiber-Bragg gratings can provide per-channel dispersion compensation, they are large and expensive as compared to device 101, as described in further detail below.

While only one device 101 is depicted in FIG. 1, system 100 can comprise a plurality of devices similar to device 101 located along fiber 107-1 so that dispersion compensation occurs at a plurality of positions along fiber 107-1. Further, while device 101 is depicted as separate from receiver 105, in some implementations, device 101 and receiver 105 can be integrated into one device 115, which is drawn in stippled lines to indicate that device 115 is optional and/or an alternative implementation. In yet further implementations, device 101 can be one or more of located at and integrated into transmitter 103, which can result in optical signals that are narrower in frequency spread, and hence more channels can be transmitted along optical fibre 107-1; in such implementations, for example, the spacing between channels can be halved (e.g. from 50 GHz spacing to 25 GHz spacing) effectively doubling the spectral efficiency. Indeed, in general, as dispersion compensation is a linear transfer function, one or more of devices 101 can be inserted anywhere in system 100 from transmitter 103 to receiver 105. As described above, fiber 107-1 optically connects transmitter 103 and device 101, and fiber 107-2 optically connects device 101 and receiver 105; however, when device 101 and receiver 105 are integrated into device 115, fiber 107-2 can be optional, with, for example, a photonic integrated circuit (PIC) conveying optical output signal 113 from device 101 to receiver 105.

Computing device 119 can include, but is not limited to, any suitable combination of electronic devices, communications devices, computing devices, personal computers, servers, laptop computers, portable electronic devices, mobile computing devices, portable computing devices, tablet computing devices, laptop computing devices, internet-enabled appliances and the like. Other suitable devices are within the scope of present implementations.

It should be emphasized that the structure of computing device 119 in FIG. 1 is purely an example, and contemplates a device that can be used for data communications with device 101. However, FIG. 1 contemplates a device that can be used for any suitable specialized functions, including, but not limited, to one or more of, computing functions, mobile computing functions and the like.

Processor 120 can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of computing device 119 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 145 that, when processed by processor 120, enables processor 120 to communicate with device 101 to control dispersion compensation at device 101. Furthermore, memory 122 storing application 145 is an example of a computer program product, comprising a non-transitory computer usable medium having a computer readable program code adapted to be executed to implement a method, for example a method stored in application 145.

Processor 120 also connects to interface 123, which can be implemented as one or more radios and/or connectors and/or network adaptors and/or transceivers, configured to communicate with device 101 via one or more wired and/or wireless communication link there between. It will be appreciated that interface 123 is configured to correspond with communication architecture that is used to implement one or more communication links, including but not limited to any suitable combination of, cables, serial cables, USB (universal serial bus) cables, and wireless links (including, but not limited to, WLAN (wireless local area network) links, WiFi links, WiMax links, cell-phone links, Bluetooth links, NFC (near field communication) links, packet based links, the Internet, analog networks, access points, and the like, and/or a combination).

Device 119 can comprise at least one input device 125 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. Input device 125 can be used to receive input which can be processed by processor 120 in conjunction with application 145 to tune device 101.

In any event, it should be understood that a wide variety of configurations for computing device 119 are contemplated.

For example, in some implementations, device 101 and computing device 119 can be integrated and/or integrated with device 115 and/or receiver 105.

While not depicted, each of device 101, transmitter 103, receiver 105, device 115, and computing device 119 comprises: one or more of a chassis and a housing; and a power source, including but not limited to, a connection to a main power supply, a battery, a backup battery, and the like.

Various implementations of device 101 are within the scope of the present specification, each implementation including at least one optical ring resonator coupled to an optical throughput bus and/or an optical output bus. Implementations of device 101 will be described hereafter with reference to FIGS. 2 to 19.

Figure 2:
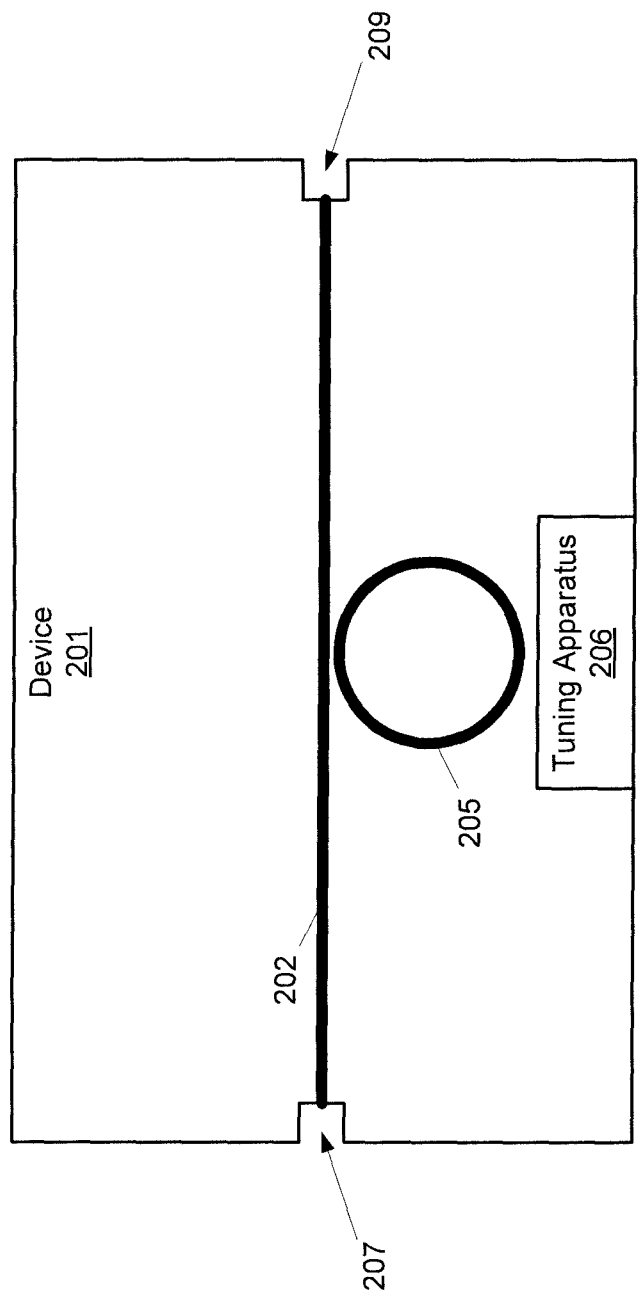
FIG. 2 depicts a schematic diagram of a device for tuning dispersion compensation, according to non-limiting implementations.

Attention is next directed to FIG. 2, which depicts device 201, an implementation of device 101, according to non-limiting implementations. In other words, device 101 can comprise device 201.

Device 201 comprises: an optical throughput bus 202 configured to convey a given optical input signal having a given optical carrier frequency; and, an optical ring resonator 205 under-coupled to optical throughput bus 202, the under-coupling and physical properties of optical ring resonator 205 selected so that: a dispersion peak of optical ring resonator 205 about aligns with the given optical carrier frequency; and, a centre of the insertion loss profile of optical ring resonator 205 is different from the given optical carrier frequency. While optical ring resonator 205 is depicted as circular, in other implementations optical ring resonator 205 can be oval, a racetrack shape, and the like; similar comments apply to other ring resonators described throughout this specification.

Device 201 can further comprise a PIC which in turn can comprise optical throughput bus 202 and optical ring resonator 205; in other words, optical throughput bus 202 and optical ring resonator 205 can be formed from a photonic integrated circuit.

As depicted, device 201 further comprises a tuning apparatus 206 configured and/or located to tune optical ring resonator 205. Tuning apparatus 206 generally comprises a device for controlling a temperature of optical ring resonator 205 including, but not limited to, one or more of a temperature control apparatus, a heater, a cooler, and a thermoelectric cooler. Specifically, as a temperature of optical ring resonator 205 changes, physical properties of optical ring resonator 205 change, including, but not limited to, the index of refraction thereby changing a frequency at which optical ring resonator 205 resonates. Hence, by changing a temperature of optical ring resonator 205, dispersion peaks and insertion loss curves, and the like, of optical ring resonator 205 can be tuned. As described below, a size and coupling of optical ring resonator 205 determines a dispersion peak value, and temperature tuning of optical ring resonator 205, lines up a dispersion peak of optical ring resonator 205 with an optical carrier frequency.

While not depicted, tuning apparatus 206 can comprise an interface for communicating with computing device 119. In other words, computing device 119 can transmit signals, and/or control a current to tuning apparatus 206, and/or control a voltage to tuning apparatus 206 and/or control a current at tuning apparatus 206, and/or control a voltage at tuning apparatus 206 in order to control tuning apparatus 206 to one or more temperatures which in turn controls a temperature of optical ring resonator 205. In some implementations, the tuning can be based on input received at input device 125.

As depicted, device 201 further comprises an optical input device 207 connected to optical throughput bus 202, optical input device 207 configured to receive an optical fiber, for example fiber 107-1, the optical fiber configured to convey the given optical input signal to optical throughput bus 202. As further depicted, device 201 further comprises an optical output device 209 connected to optical throughput bus 202, optical output device 209 configured to convey an optical output signal to one or more of: an optical fiber and an optical receiver, for example, respectively, fiber 107-2 and receiver 105. Each of optical input device 207 and optical output device 209 can comprise one or more of a fiber optic coupler, a fiber optic connector, and the like. Alternatively, one or more of optical input device 207 and optical output device 209 can comprise an input or an output from other PICs and/or other circuits within the same PIC that forms device 201.

In general, optical ring resonator 205 is under-coupled to optical throughput bus 202 as such under-coupling can provide a good balance between dispersion compensation and insertion loss, as compared to over-coupling and critical coupling. For example, attention is next directed to FIG. 3 which depicts optical throughput buses 301-1, 301-2, 301-3 and three example respective optical ring resonators 303-1, 303-2, 303-3, coupled thereto. Specifically, optical ring resonator 303-1 is under-coupled to optical throughput bus 301-1, optical ring resonator 303-2 is critically-coupled to optical throughput bus 301-2, and optical ring resonator 303-3 is over-coupled to optical throughput bus 301-3. Each optical ring resonator 303-1, 303-2, 303-3 is assumed to have about the same diameter.

Figure 3:
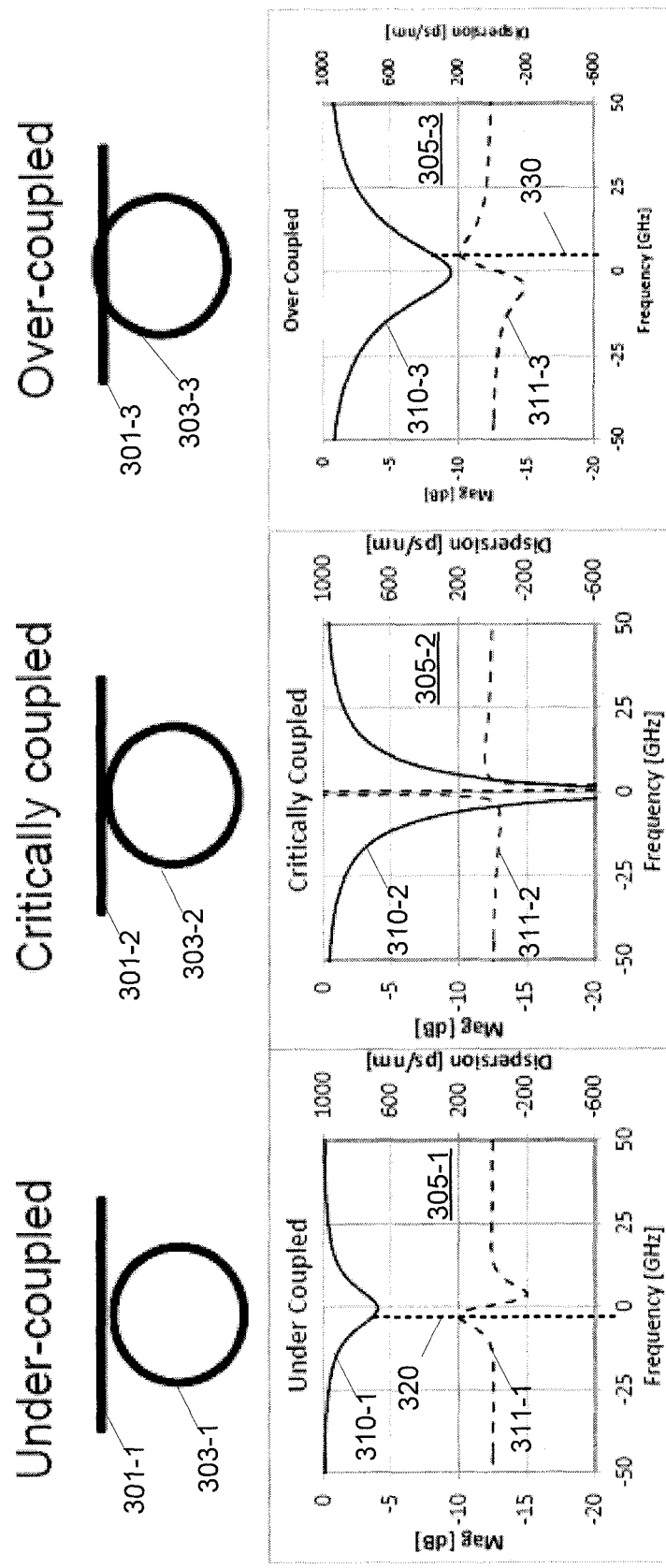
FIG. 3 depicts general behaviour of optical ring resonators when under-coupled, critically coupled and over-coupled to an optical throughput bus.

FIG. 3 further depicts graphs 305-1, 305-2, 305-3 showing corresponding simulated transmission magnitude profiles 310-1, 310-2, 310-3 and simulated dispersion curves 311-1, 311-2, 311-3 for each of optical ring resonators 303-1, 303-2, 303-3. Specifically, graphs 305-1, 305-2, 305-3 depict transmission magnitude and dispersion as a function of frequency, with the centre "0 GHz" frequency for each being a reference frequency, for example, an optical carrier frequency used in optical telecommunications in a range of about 184.5-238 THz, however other optical carrier frequencies are within the scope of present implementations. A similar nomenclature with regards to a reference frequency will be used throughout.

Furthermore, while transmission magnitude profiles 310-1, 310-2, 310-3 are depicted in FIG. 3, it is appreciated that transmission magnitude can be used to show insertion loss as transmission magnitude curves are inverted insertion loss curves. Hence, throughout this specification, where transmission magnitude profiles are depicted, it is appreciate that such transmission magnitude profiles show insertion loss.

The reference frequency of an optical ring resonator can be coarsely controlled by controlling a diameter and/or refractive index of an optical ring resonator (e.g. during fabrication thereof) and/or finely controlled by controlling the temperature of the optical ring resonator, as described above, for example using tuning apparatus 206, which changes the physical properties thereof, such as refractive index. In other words, physical properties, such as the diameter and/or circumference and the refractive index, of an optical ring resonator determines the frequency at which the optical ring resonator resonates, and the latter can be tuned and/or changed by controlling the temperature of the optical ring resonator.

It is further appreciated that insertion loss for an under-coupled optical ring resonator is generally smaller than either a similar critically coupled optical ring resonator or an over-coupled optical ring resonator, for a corresponding dispersion value. For example, at a frequency corresponding to line 320 on under-coupled optical ring resonator graph 305-1 (about −5 GHz from the reference frequency), for a dispersion of about 200 ps/nm (i.e. a dispersion peak of dispersion curve 311-1), the corresponding insertion loss is about 4 dB; for a corresponding dispersion of about 200 ps/nm on critically coupled ring-resonator graph 305-2, insertion loss is more than 20 dB (and indeed is in a range where insertion loss is increasing at a rapid rate); and for a corresponding dispersion of about 200 ps/nm on over-coupled ring resonator graph 305-3, insertion loss is about 8 dB, e.g. at a frequency corresponding to line 330. Further, in graph 305-3, the shape of the dispersion curve has flipped, relative to graph 305-1, so that the positive dispersion peak of curve 311-3 (at line 330) in graph 305-3 is on a positive side of the reference frequency, while the positive dispersion peak of curve 311-1 (at line 320) in graph 305-1 is on a negative side of the reference frequency.

Hence, to achieve maximum dispersion compensation (i.e. a peak of a dispersion curve), for given designed parameters and/or given dimensions of an optical ring resonator (i.e. a given diameter) when coupling an optical ring resonator to an optical throughput bus, while simultaneously achieving a minimum insertion loss, an optical ring resonator is under-coupled to the optical throughput bus.

It is further appreciated that dispersion curve 311-1 has two dispersion peaks: a first dispersion peak at about 200 ps/nm maximum dispersion and a second dispersion peak at about −200 ps/nm maximum dispersion (i.e. maximum absolute dispersion); however, as described below, the values of the dispersion peaks can be controlled and/or varied and/or pre-determined based on coupling to an optical throughput bus and/or via physical properties of an optical ring resonator, and hence dispersion curve 311-1 is depicted as an example only.

In any event, depending on the desired dispersion compensation, under-coupling of an optical ring resonator to an optical throughput bus and physical properties thereof are selected so that either the first dispersion peak or the second dispersion peak aligns with the optical carrier frequency of the optical signal; In general, as described above, ring dimensions and coupling determine the shape of the dispersion curve, and the specific alignment of the first dispersion peak or the second dispersion peak with the optical carrier frequency is achieved by tuning the temperature of the optical ring resonator. In other words, when dispersion in an optical fiber is negative, then the positive dispersion peak (e.g. +200 ps/nm, as depicted) is selected to align with the optical carrier frequency; and, when dispersion in an optical fiber is positive, then the negative dispersion peak (e.g. −200 ps/nm, as depicted) is selected to align with the optical carrier frequency. The position of the alignment can be controlled, for example via a tuning apparatus similar to tuning apparatus 206 (e.g. by controlling a temperature of the optical ring resonator).

Hence, returning to FIG. 2, device 201 can be manufactured so that that alignment between a portion of a dispersion curve and a given optical carrier signal is initially arbitrary, though coarsely located close to the given optical carrier signal, and the alignment can be finely tuned using tuning apparatus 206 when device 201 is deployed in system 100.

Further, the degree of dispersion compensation, and the width thereof, can be further controlled by the degree of under-coupling. The degree of under-coupling can also provide an initial position for the dispersion peak alignment with the optical carrier frequency. However, the alignment of a dispersion peak of optical ring resonator 205 can be further controlled using tuning apparatus 206.

Figure 4:
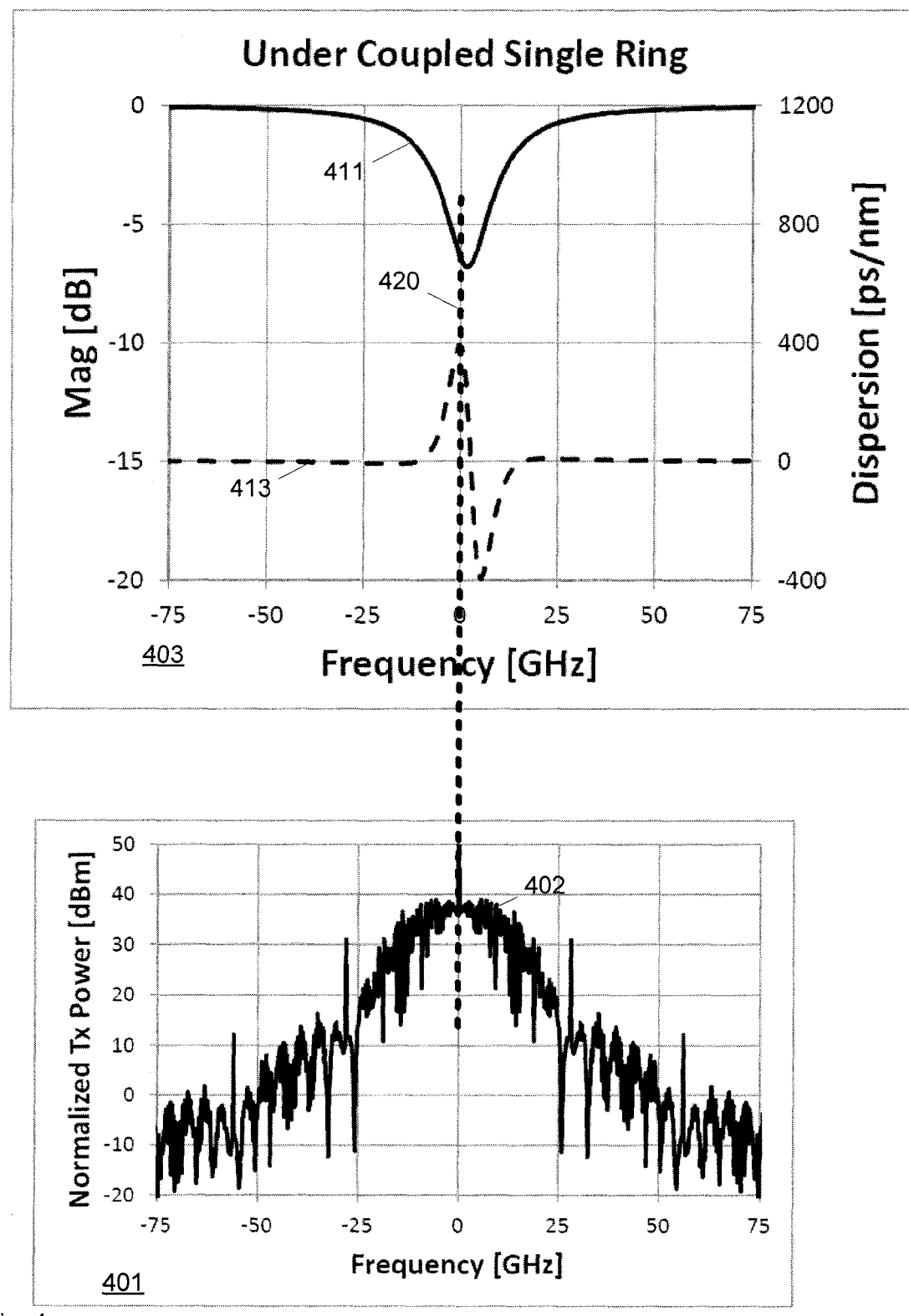
FIG. 4 depicts a graph of an example optical input signal, and a graph of transmission magnitude profile and a dispersion curve of a non-limiting example optical ring resonator under-coupled to an optical throughput bus, according to non-limiting implementations.

For example, attention is next directed to FIG. 4 which depicts a graph 401 of an example transmitted optical signal 402 in dB, similar to optical signal 111 of FIG. 1, though optical signal 402 depicted on an amplitude (y-axis) vs. frequency (x-axis) scale, as are optical signals referred to hereafter. FIG. 4 further depicts a graph 403 of a transmission magnitude profile 411 and a dispersion curve 413 of a non-limiting example optical ring resonator 205 under-coupled to optical throughput bus 202. Graph 401 depicts a simulated optical signal 402 at a reference optical carrier frequency indicated by "0 GHz", for example a frequency used in optical telecommunications, and a frequency coverage that is due to transmission through an optical fiber such as optical fiber 107-1. Optical signal 402 further comprises a central peak, and minima, a first minimum on either side of the central peak being at a frequency that is proportional to the data rate of optical signal 402 (e.g. the first node is always at frequency corresponding to frequency/data rate for a non-return-to-zero (NRZ) signal), as depicted at about +28 GHz and about −28 GHz. While, as depicted, optical signal 402 comprises a sinc squared function for a non-return-to-zero (NRZ) function, in other implementations, optical signal 402 can comprise a return-to-zero function, where it is not minimum at the data rate. Other optical signal shapes and/or other optical signal formats are within the scope of present implementations. Furthermore while the present specification refers to optical signal 402 having minima, such minima can interchangeably be referred as nodes, and the like.

As indicated by line 420, under-coupling of optical ring resonator 205 to optical throughput bus 202 is selected so that a +400 ps/nm peak of dispersion curve 413 is aligned (and/or can be aligned using tuning apparatus 206) with the optical carrier frequency of optical signal 402, and a centre of a transmission magnitude profile of optical ring resonator 205 (i.e. transmission magnitude profile 411) is different from the given optical carrier frequency of optical signal 402. Hence, it is assumed in FIG. 4, that residual dispersion in an optical fiber is negative, (the residual dispersion including dispersion due to other optical components located along the optical fiber, including, but not limited to DCMs, amplifiers, filters and the like), and a positive dispersion compensation at the optical carrier frequency is used to compensate for the negative dispersion. It is further assumed that the positive dispersion peak of dispersion curve 413 was selected to align with the optical carrier frequency of optical signal 402 by using tuning apparatus 206.

In other words, a maximum dispersion compensation is provided to optical signal 402 at the optical carrier frequency, at an insertion loss that is different from the maximum insertion loss of optical ring resonator 205. Such a combination provides maximum dispersion compensation at the optical carrier frequency, while minimizing insertion loss for a given dispersion compensation value, as compared to systems where optical ring resonators are over-coupled or critically coupled to an optical throughput bus.

Dispersion compensation generally occurs over a range of frequencies of optical signal 402, according to the width of the dispersion peak of dispersion curve 413; further, those portions of optical signal 402 that correspond to the negative dispersion peak (i.e. −400 ps/nm) of dispersion curve 413 will be negatively compensated; however, the negative dispersion peak does not contribute as much to dispersion compensation as does the positive dispersion peak, as the negative dispersion peak is located on a shoulder of optical signal 402 at higher frequencies, where less data is encoded as compared to data encoded at and/or around the optical carrier frequency. A total dispersion compensation of optical signal 402, after interacting with an example optical ring resonator having characteristics similar to dispersion curve 413 is determined from the product of a complex signal (e.g. a complex representation of optical signal 402) and filter transfer function (including phase, e.g. a filter transfer function of optical ring resonator 303-1) versus frequency. The dispersion curve 413 comprises a second derivative of a phase of a ring transfer function. Hence, frequencies of optical signal 402 will have a net dispersion compensation effect determined by the alignment of optical signal 402 with dispersion curve 413.

Insertion loss of optical signal 402 also occurs according to a width of transmission magnitude profile 411: in other words, a total insertion loss of optical signal 402, after interacting with an example optical ring resonator having characteristics similar to transmission magnitude profile 411 is an integral of transmission magnitude profile 411 (in linear units rather than dB units) times optical signal 402, as compared to an integral of optical signal 402 alone. Hence, frequencies of optical signal 402 which are away from a minimum of transmission magnitude profile 411 will be largely unaffected by insertion loss.

Furthermore, comparing graph 403 to graph 305-1 of FIG. 3, maximum dispersion compensation provided by an example optical ring resonator 205 as represented by graph 403 is about 400 ps/nm, with a corresponding insertion loss of about 6 dB, while, maximum dispersion compensation provided by an example optical ring resonator as represented by graph 305-1 is about 200 ps/nm, with a corresponding insertion loss of about 4 dB. Furthermore, the width of the dispersion peak in graph 403 is narrower than the width of the dispersion peak in graph 305-1. Hence, under-coupling of an optical ring resonator to an optical throughput bus can be selected to provide a given dispersion compensation, however the greater the maximum dispersion compensation, the greater the insertion loss, and the narrower the dispersion curve.

Alternatively, under-coupling of optical ring resonator 205 to optical throughput bus 202 can be selected so that the peak at about −400 ps/nm aligns with the optical carrier frequency of optical signal 402, and/or the peak at about −400 ps/nm can be aligned with optical carrier frequency using tuning apparatus 206. Indeed, a dominant positive dispersion compensation or a dominant negative dispersion compensation by an optical ring resonator under-coupled to an optical throughput bus can be selected by adjusting tuning apparatus 206 so that the positive dispersion peak or the negative dispersion peak aligns with the optical carrier frequency of an optical signal. The total dispersion compensation is then determined as described above.

Further, by varying the degree of under-coupling, and/or by tuning the position of a dispersion curve, under-coupling of an optical ring resonator to an optical throughput bus and physical properties of the optical ring resonator can be selected so that dispersion compensation of the dispersion peak is between either: about 150 ps/nm and to 500 ps/nm; or about −150 ps/nm and to −500 ps/nm; and so that insertion loss due to the transmission magnitude profile is between about 1 dB and about 7 dB. However, other ranges of dispersion compensation and insertion loss are within the scope of present implementations. For example, the presently described ranges can be suitable for optical signals with bit rates around 28 Gb/s; however, for lower bit rates, physical properties and coupling of optical ring resonator 205 can be selected that results in higher dispersion compensation, though a tradeoff can be that the resulting dispersion peaks can be narrower and/or the resulting dispersion curves can have a narrower spectrum than as depicted herein.

Figure 5:
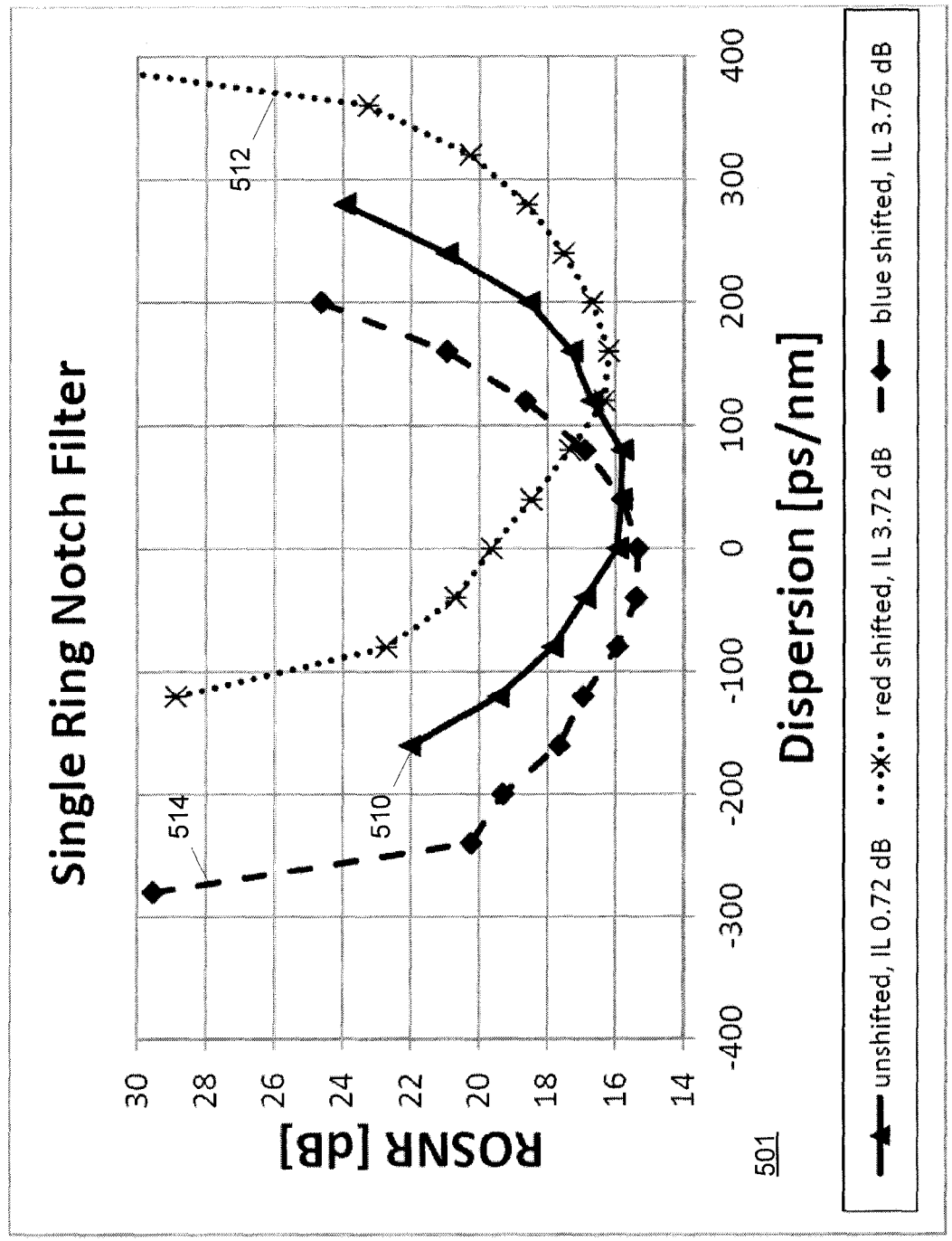
FIG. 5 depicts a graph of simulations of required optical signal to noise ratio (ROSNR) received at a given receiver, for the device of FIG. 2, according to non-limiting implementations.

The effect of device 201 is further depicted in FIG. 5 which shows a graph 501 of simulations of three curves 510, 512, 514 of required optical signal to noise ratio (ROSNR) to achieve a given system performance (and/or a required system performance) at a given receiver, such as receiver 105, as a function of residual link dispersion for each of: optical signals (curve 510) at different dispersion values when uncompensated; optical signals (curve 512) at different dispersion values when the optical signals are to be compensated by device 201 when a negative dispersion peak of dispersion curve 413 is aligned with the optical carrier frequency of the optical signals; and optical signals (curve 514) at different dispersion values when the optical signals are to be compensated by device 201 when a positive dispersion peak of dispersion curve 413 is aligned with the optical carrier frequency of the optical signals (curve 514). In particular, curves 512, 514 show the dispersion of the optical signals before being dispersion compensated by device 201, and the ROSNR at each dispersion value after being dispersion compensated by respective versions of device 201.

Residual link dispersion generally comprises the dispersion of an optical signal prior to being received at receiver 105, after being transmitted through optical fiber 107-1, and any amplifiers and/or prior art DCMs that might be present in system 100.

In general, ROSNR is the optical signal-to-noise ratio required for data in an optical signal to be detected by a receiver at a given dispersion value; lower ROSNR is generally better so that more noise can be tolerated at a receiver, such as receiver 105, and the more amplifiers can be placed along optical fiber 107-1, so that optical signals can be transmitted over longer distances. It is appreciated that ROSNR can be respective to a system and/or a given system type and/or a given receiver and/or given receiver type, and that systems and/or different system types and/or different receivers and/or different receiver types can have different ROSNRs, which can be defined during design and/or manufacture of the given receiver and/or given receiver type. Further, a given system and/or a given system type can also have a maximum ROSNR; in examples provided herein, it is assumed that a maximum ROSNR is about 20 dB (measured in 0.1 nm bandwidth). Put another way, a figure of merit for ROSNR can be the maximum ROSNR that a system can tolerate, which is assumed to be about 20 dB in non-limiting examples provided; however other systems and/or system types can have different maximum ROSNR values. In general, ROSNR graphs go to infinity, and maximum ROSNR can be determined by customer risk tolerance and/or noise of presented line system (amplifiers) etc. Further, units for ROSNR herein are in dB/0.1 nm, however, in shorthand used herein units of ROSNR will be in terms of dB.

When dispersion occurs in a system without a dispersion compensation module, for example with curve 510, ROSNR is at a minimum when dispersion is "0" (i.e. a low ROSNR can be tolerated), while for increasing amounts of dispersion, higher ROSNR is required so that a receiver can detect the data encoded in the optical signal.

Hence, for curve 510, where no dispersion compensation is to be provided for the optical signals represented by curve 510, dispersion from about −140 ps/nm to about +220 ps/nm can be tolerated, as ROSNR is less than or about equal to 20 dB on curve 510 between about −140 ps/nm and about +220 ps/nm. The insertion loss ("IL") for curve 510 is about 0.72 dB due mainly to waveguide losses.

However, on curve 512, for which negative dispersion compensation of 400 ps/nm is to occur at the optical carrier frequency, ROSNR is less than or about equal to 20 dB for dispersion below about 310 ps/nm; hence, when a negative dispersion peak of device 201 is about aligned with an optical carrier frequency of optical signals corresponding to curve 512 (e.g. using tuning apparatus 206), device 201 compensates for dispersion so that ROSNR is about 20 dB at about 310 ps/nm or less. Total insertion loss for optical signals represented by curve 512 is about 3.72 dB, assuming dispersion compensation by transmission magnitude profile 411.

Similarly, on curve 514, for which positive dispersion compensation of 400 ps/nm is to occur at the optical carrier frequency, ROSNR less than or about equal to 20 dB for dispersion above about −230 ps/nm; hence, when a positive dispersion peak of device 201 is about aligned with an optical carrier frequency of optical signals corresponding to curve 514 (e.g. using tuning apparatus 206), device 201 compensates for dispersion so that ROSNR is about 20 dB at about −230 ps/nm or more. Total insertion loss for optical signals represented by curve 514 is about 3.76 dB, assuming transmission magnitude profile 411.

Hence, use of device 201, with peak dispersion compensation of about 400 ps/nm or about −400 ps/nm, extends the acceptable dispersion on a fiber optic line by about 100 ps/nm in either the positive or negative directions.

Figure 6:
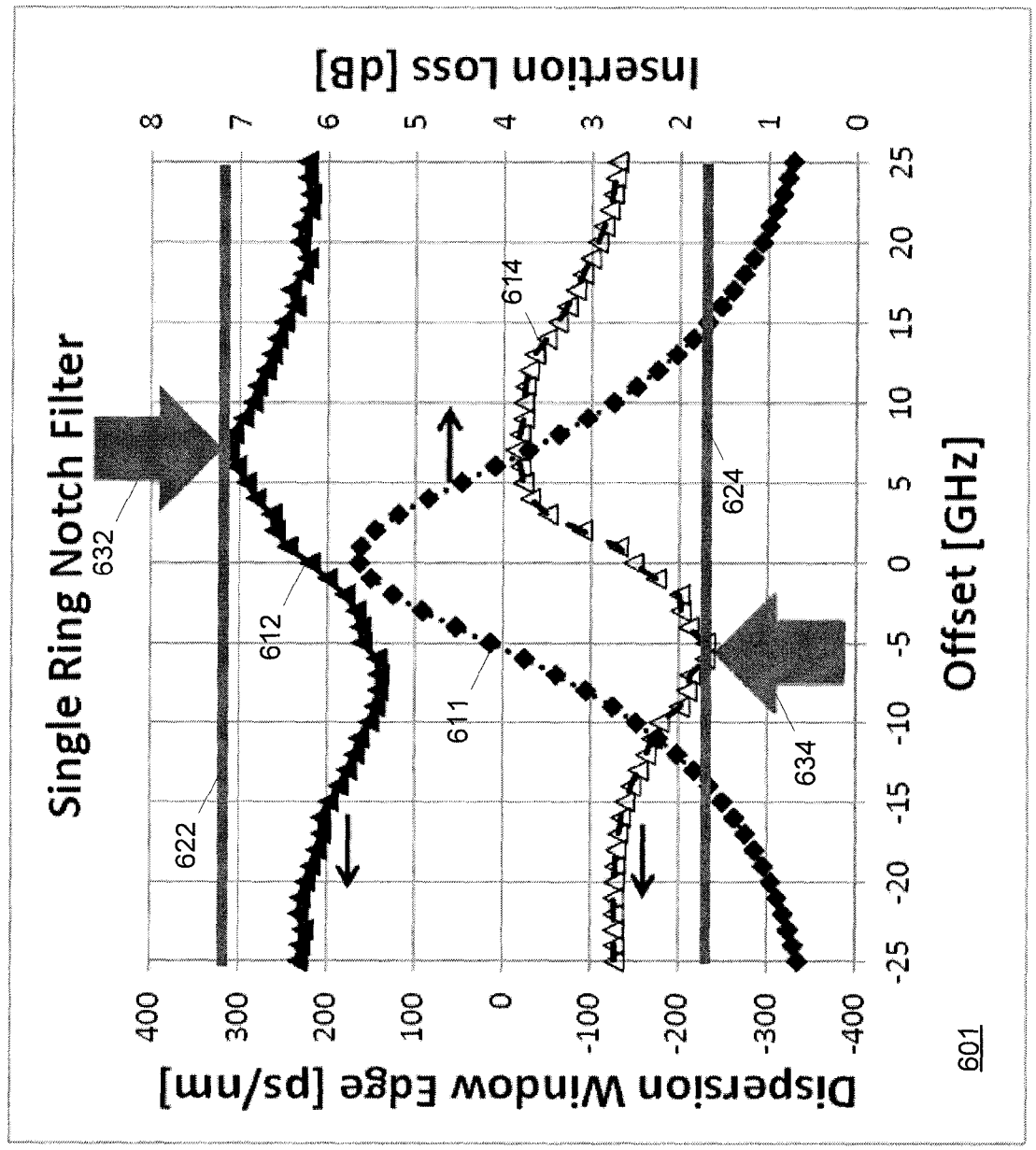
FIG. 6 depicts a graph of an insertion loss profile as a function of offset frequency of the device of FIG. 2, and dispersion window edge curves at 20 dB ROSNR (measured in 0.1 nm bandwidth) corresponding to curves of FIG. 5, according to non-limiting implementations.

Attention is next directed to FIG. 6 which depicts a graph 601 of an insertion loss profile 611 as a function of offset frequency (i.e. from a reference frequency at "0" GHz), and dispersion window edge curves 612, 614 at 20 dB ROSNR corresponding, respectively, to curves 512, 514, as a function of offset frequency, which in turn correspond to different alignments of dispersion curve 413 with optical signal 402 of FIG. 4.

Specifically, in graph 601, it is assumed that a position of dispersion curve 413 and transmission magnitude profile 411 of FIG. 4 are each fixed, so that a minimum of transmission magnitude profile 411 is located at reference frequency "0" GHz; hence, insertion loss profile 611 is similar to transmission magnitude profile 411, though insertion loss profile 611 is depicted as inverted with respect to transmission magnitude profile 411 (e.g. the right hand side y-axis is from 0-8 dB insertion loss as compared to the transmission magnitude profile y-axis in FIG. 4, which is shown in terms of a magnitude of transmission in dB; one is the inversion of the other, but each are otherwise substantially the same).

In any event, it is further assumed in FIG. 6 that a position of optical signal 402 is varied with respect to the position of dispersion curve 413; hence, the offset frequency of graph 601 refers to the offset of an optical carrier frequency of optical signal 402 with respect to a centre of dispersion curve 413 and/or a centre of transmission magnitude profile 411 as a position of optical signal 402 is varied with respect to dispersion curve 413.

Hence, curves 612, 614 of FIG. 6 respectively represent the movement of the high and low 20 dB points, respectively, of curves 512, 514 as the position of optical signal 402 is varied with respect to dispersion curve 413; lines 622, 624 each represent an extreme position of a dispersion edge of curves 612, 614, which is also shown by arrows 632, 634.

Hence, FIG. 6 clearly shows that the dispersion window of device 201 is between about 310 ps/nm and about −230 ps/nm.

In practise, however, an optical carrier frequency of an optical signal would be fixed and a position of dispersion curve 413 is tuned using tuning apparatus 206, so that a maximum dispersion window edge can be achieved, as in FIG. 5.

Figure 7:
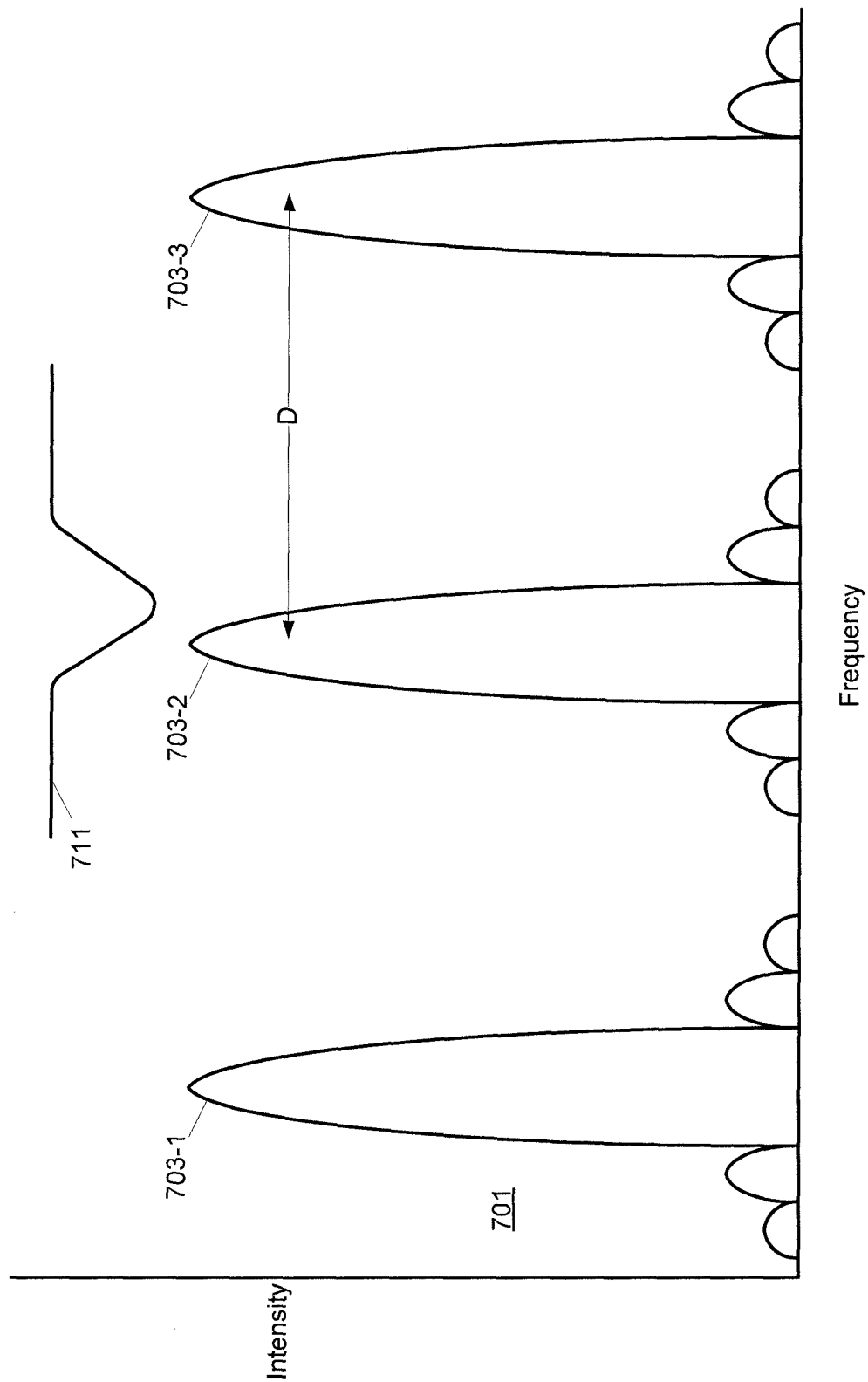
FIG. 7 depicts a schematic diagram of a plurality of optical carrier channels that can be carried on an optical fiber, and a transmission magnitude profile of the device of FIG. 2 tuned to a frequency close to, but different from, an optical carrier frequency of one of the optical channels, according to non-limiting implementations.

In some implementations an optical signal transmitted through an optical fiber comprises more than one channel. For example, attention is next directed to FIG. 7 which depicts a graph 701 of example optical signals 703-1, 703-2 703-3 as a function of frequency, where each optical signal 703-1, 703-2 703-3 represents a different optical channel on an optical fiber, and each optical signal 703-1, 703-2 703-3 is similar to optical signal 109. Example nodes of each optical signal 703-1, 703-2 703-3 are more clearly visible in FIG. 7 than in FIG. 4, as FIG. 7 is drawn schematically, on a linear scale, while FIG. 4 is drawn on a log scale; while three nodes on either side of a respective optical carrier frequency of each optical signal 703-1, 703-2, 703-3 are depicted. Further, adjacent optical signals 703-1, 703-2, 703-3 are separated by a frequency "D", which can also be referred as the spacing and/or delta between each optical signal 703-1, 703-2, 703-3 and/or each channel.

FIG. 7 also depicts a transmission magnitude profile 711 of device 201, similar to one or more of transmission magnitude profiles 310-1, 411 tuned to a frequency close to, but different from, an optical carrier frequency of channel 703-2. For example, optical signals 703-1, 703-2, 703-3 can be transmitted by transmitter 103 on optical fiber 107-1 to interact with an optical ring resonator at device 101, when device 101 comprises device 201; channel 703-2 hence interacts with optical ring resonator 205 at device 201, having transmission magnitude profile 711 and a dispersion curve similar to one or more of dispersion curves 311-1, 413. To ensure that optical signal 703-1, 703-3 are not affected by optical ring resonator 205, bandwidth of transmission magnitude profile 711 excludes other given optical signals 703-1, 703-3, adjacent to given optical signal 703-2, that can also be conveyed on optical throughput bus 202, the other given optical signals 703-1, 703-3 and the given optical signal 703-2 each comprising a data channel on optical throughput bus 205.

In other words, coupling and physical properties of a given optical ring resonator are selected to interact with a given channel and/or an optical signal of a given optical carrier frequency without affecting other channels and/or other optical signals of other given optical carrier frequencies being transmitted and/or conveyed through optical throughput bus 202 and/or optical fiber 107-1. A given optical ring resonator can then be tuned to a given frequency as described above.

While coupling and/or physical properties of optical ring resonator 205 are selected to match a given channel (e.g. a given optical carrier frequency), in yet further implementations, a Free Spectral Range (FSR) of optical ring resonator 205 can be selected to cover all channels on optical fiber 107-1 by selecting the FSR of optical ring resonator 205 to match the channel spacing. In other words, optical ring resonator 205 can be designed to with an FSR that mimics spacing of the channels, so a single optical ring resonator can provide same compensation on each channel.

Device 201 can be modified to compensate for dispersion for a plurality of optical carrier frequencies and/or a plurality of optical channels. For example, attention is next directed to FIG. 8, which depicts a device 801, similar to device 201, with like elements having like numbers, however with an "8" preceding each number rather than a "2". Hence, device 801 comprises: an optical throughput bus 802, a plurality of optical ring resonators 805-1, 805-2, 805-3, a plurality of respective tuning apparatuses 806-1, 806-2, 806-3, an optical input device 807 and an optical output device 809.

Device 801 is hence substantially similar to device 201, however device 801 comprises a plurality of optical ring resonators 805-1, 805-2, 805-3 under-coupled to optical throughput bus 802, each of plurality of optical ring resonators 805-1, 805-2, 805-3 tuned to a different optical carrier frequency; for example each of plurality of optical ring resonators 805-1, 805-2, 805-3 can be tuned to a respective optical carrier frequency corresponding to respective optical signals 703-1, 703-2, 703-3 of FIG. 7. As such, each of plurality of optical ring resonators 805-1, 805-2, 805-3 can have different physical properties (e.g. different diameters and/or different indices of refraction), and/or can be tuned to different frequencies using respective tuning apparatus 806-1, 806-2, 806-3, as described below. Further, plurality of optical ring resonators 805-1, 805-2, 805-3 are positioned, in series along optical throughput bus 802; as each insertion loss profile of each of plurality of optical ring resonators 805-1, 805-2, 805-3 excludes adjacent optical signals and/or optical signals other than the optical signal for which a given optical ring resonators 805-1, 805-2, 805-3 is tuned, each of plurality of optical ring resonators 805-1, 805-2, 805-3 provides dispersion compensation for a respective optical channel.

Figure 8:
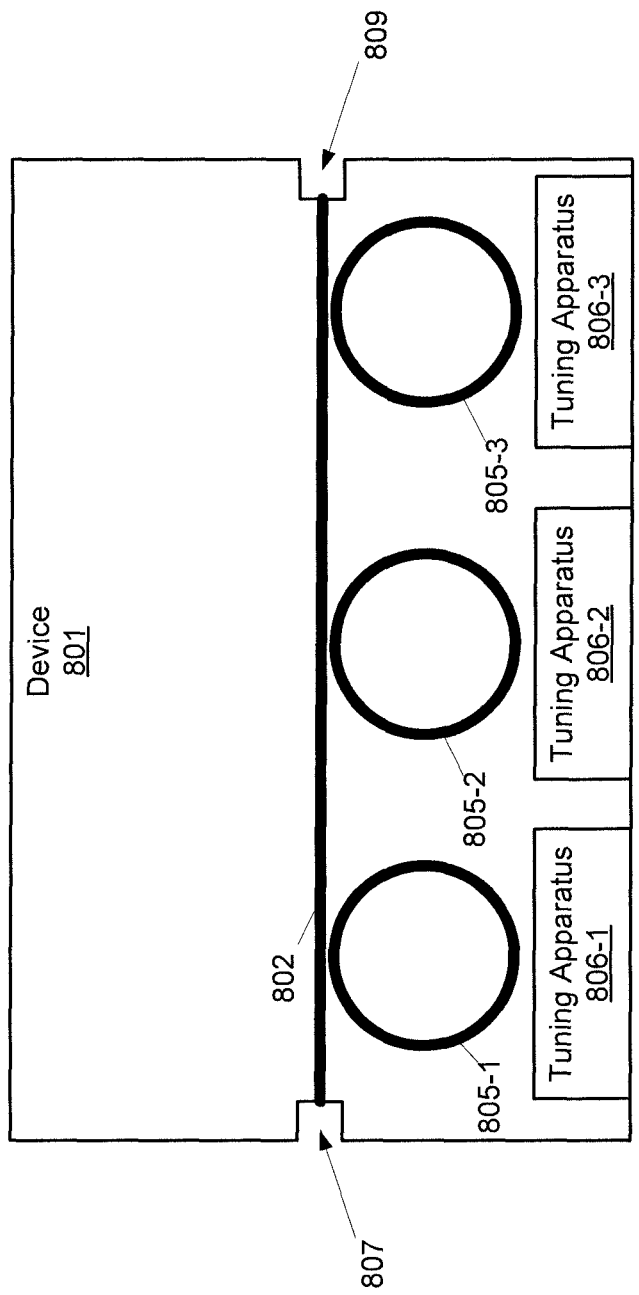
FIG. 8 depicts a schematic diagram of a device for tuning dispersion compensation for a plurality of optical carrier channels, according to non-limiting implementations.

While only three optical ring resonators 805-1, 805-2, 805-3 are depicted in FIG. 8, device 801 can comprise any number of optical ring resonators, for example an optical ring resonator for each channel for which dispersion compensation is to be provided. Furthermore, optical ring resonators 805-1, 805-2, 805-3 can be in any order on optical throughput bus 802: for example, while each of optical ring resonators 805-1, 805-2, 805-3 can provide dispersion compensation for a given channel, the order of optical ring resonators 805-1, 805-2, 805-3 on optical throughput bus 802 is not dependent on a frequency of channels.

Further, while not depicted, each tuning apparatus 806-1, 806-2, 806-3 comprises an interface to computing device 119, or the like, similar to tuning apparatus 206; hence, each tuning apparatus 806-1, 806-2, 806-3 can be tuned independently of each other.

It is yet further appreciated that each of devices 201, 801 can be incorporated into device 115, so that device 115 comprises one or more of device 201, 801 and optical receiver 105 in communication with a respective optical throughput bus 202, 802.

Figure 9:
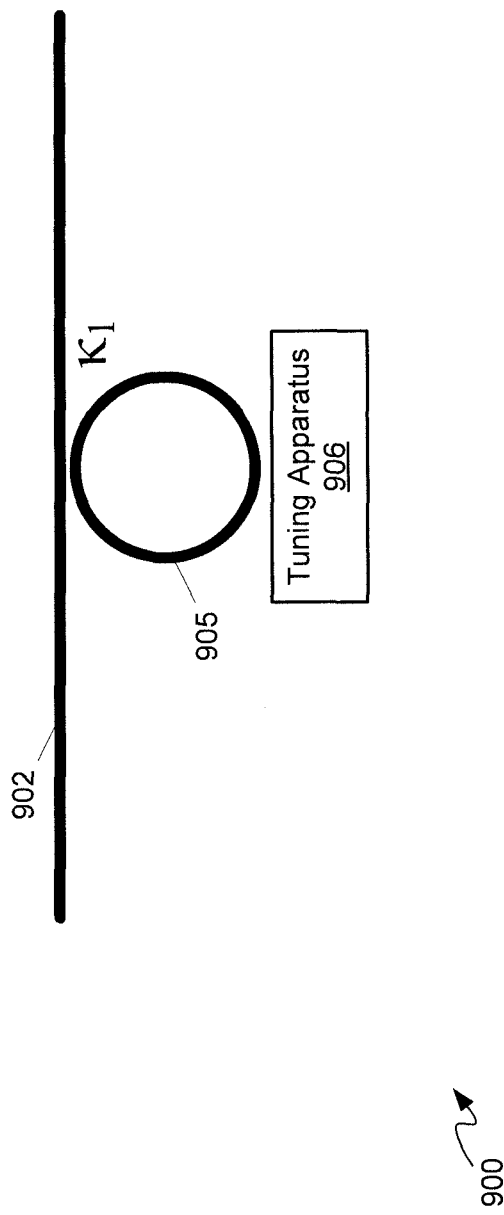
FIG. 9 depicts a schematic diagram of a system for tuning dispersion compensation, according to non-limiting implementations.

Attention is next directed to FIG. 9 which depicts a system 900 comprising an optical throughput bus 902, similar to optical throughput bus 202, and an optical ring resonator 905, similar to optical ring resonator 205, optical ring resonator 905 under-coupled to optical throughput bus 902. System 900 further comprises a tuning apparatus 906 for tuning physical properties of optical ring resonator 905. The degree of under-coupling between optical ring resonator 905 and optical throughput bus 902 is represented by a value κ1, which is determined by the distance between an edge of optical ring resonator 905 and optical throughput bus 902.

In order to optimize under-coupling, ROSNR for simulated optical signals having different dispersion values can be determined as a function of κ1, for example, in simulation software, similar to curves 512, 514 of FIG. 5. When one or more values of κ1 are determined that lead to ROSNR being within an acceptable value (e.g. about 20 dB) at a given residual dispersion limit, between about 200 ps/nm and 400 ps/nm, a device comprising an optical ring resonator under-coupled to an optical throughput bus can be manufactured, for example using photonic integrated circuits. Such under-coupling will result in a transmission magnitude profile and dispersion curve and having shapes respectively similar to transmission magnitude profile 411 and dispersion curve 413 of FIG. 4, though positions and widths and/or bandwidths of each transmission magnitude profile and dispersion curve will vary depending on the degree of under-coupling.

The resulting simulated devices can then be manufactured using photonic integrated circuits, similar to device 201 (and/or device 801 when more than one optical ring resonator is to be coupled to an optical throughput bus).

When the manufactured device is deployed, for example at a receiver, residual dispersion of a link (e.g. an optical fiber such as fiber 107-1) can be determined using conventional techniques, either manually or automatically, and tuning apparatus 906 can be used to tune system 900 appropriately to compensate for either positive or negative dispersion.

For example, computing device 119 can be used to set tuning apparatus 906 to a given temperature that corresponds to a given dispersion peak position of an optical ring resonator. In other words, memory 122 of computing device 119 can store a table comprising a list of settings for tuning apparatus 206 corresponding to different positions for the dispersion curves of device 201.

Alternatively, a residual dispersion value of a link can be determined to determine not only positive or negative dispersion but a degree of dispersion (e.g. whether a +/−100 ps/nm, +/−200 ps/nm, +/−400 ps/nm, or another value of residual dispersion is present on the link). A device can be manufactured and/or selected (presuming already manufactured) providing the desired degree of dispersion compensation and inserted into the link, similar to device 101. In some implementations, residual link dispersion of a link can be determined automatically and provided to computing device 119, which can responsively and automatically tune device 101, etc., to given dispersion compensation conditions.

In some implementations, system 900 can be modified to provide more flexibility on dispersion compensation, though with some tradeoff on insertion loss.

Figure 10:
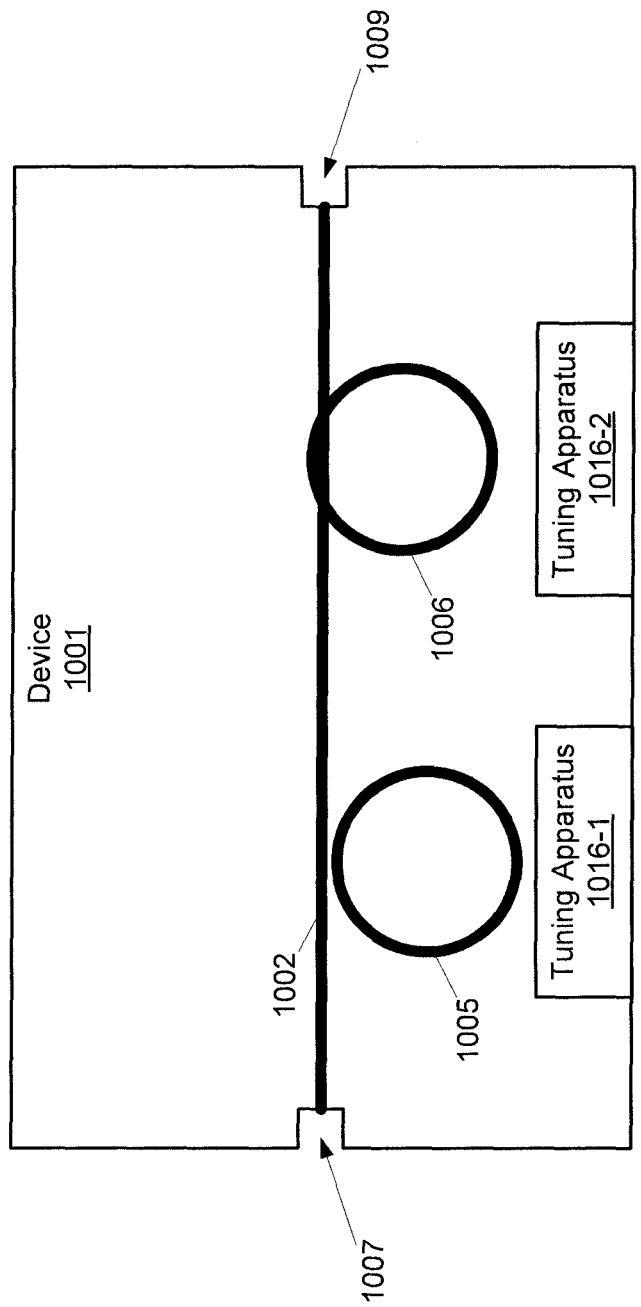
FIG. 10 depicts a schematic diagram of a device for tuning dispersion compensation, according to alternative non-limiting implementations.

For example, attention is next directed to FIG. 10 which depicts a device 1001 similar to device 201, with like elements having like numbers, however with a "10" preceding each number rather than a "2". Device 101 can comprise device 1001. Device 1001 comprises: an optical throughput bus 1002 configured to convey a given optical input signal having a given optical carrier frequency; and, a first optical ring resonator 1005 under-coupled to optical throughput bus 1002 and a second optical ring resonator 1006 over-coupled to optical throughout bus 1002 (though the under-coupling and over-coupling in FIG. 10 are exaggerated for clarity), respective coupling of each of first optical ring resonator 1005 and second optical ring resonator 1006 to optical throughput bus 1002 selected, and respective physical properties thereof selected, so that: combined dispersion compensation of first optical ring resonator 1005 and second optical ring resonator 1006 is at a given dispersion value at the given optical carrier frequency; and, a combined insertion loss profile of the first optical ring resonator and the second optical ring resonator is at a given transmission value at the given optical carrier frequency. Furthermore, optical ring resonators 1005, 1006 along optical throughput bus 1002 can be in any order; for example, while as depicted optical ring resonator 1005 is located before optical ring resonator 1006, in other implementations, optical ring resonator 1006 is located before optical ring resonator 1005. In other words, an order of optical ring resonators 1005, 1006 is irrelevant to the total dispersion compensation provided by device 1001, as described below.

Similar to device 201, device 1001 further comprises an optical input device 1007 (similar to optical input device 207) connected to optical throughput bus 1002, optical input device 1007 configured to receive an optical fiber (e.g. optical fiber 107-1), the optical fiber configured to convey the given optical input signal to optical throughput bus 1002. Device 1001 further comprises an optical output device 1009 (similar to optical output device 209) connected to optical throughput bus 1002, optical output device 1009 configured to convey an optical output signal to one or more of: an optical fiber (e.g. optical fiber 107-2) and an optical receiver (e.g. receiver 105).

Note that the combination of first optical ring resonator 1005 and second optical ring resonator 1006 at optical throughout bus 1002 can colloquially be referred to as a cascaded filter.

Hence, device 1001 is similar to device 201, however device 1001 comprises an over-coupled optical ring resonator 1006 in addition to an under-coupled optical ring resonator 1005, as in device 201. Further, device 1001 comprises two tuning apparatuses 1016-1, 1016-2, one for each of first optical ring resonator 1005 and second optical ring resonator 1006 in a one-to-one relationship for independent tuning of each of first optical ring resonator 1005 and second optical ring resonator 1006; though, in other implementations, device 1001 can comprise one tuning apparatus to simultaneously tune each first optical ring resonator 1005 and second optical ring resonator 1006 by controlling each of first optical ring resonator 1005 and second optical ring resonator 1006 to the same temperature.

In yet further implementations device 1001 can comprise a tuning apparatus for tuning one of first optical ring resonator 1005 and second optical ring resonator 1006, however the other of first optical ring resonator 1005 and second optical ring resonator 1006 can remain fixed (e.g. via a temperature control apparatus for controlling one of first optical ring resonator 1005 and second optical ring resonator 1006 to a given temperature and hence a given set of physical properties and/or a given index of refraction).

Hence, device 1001 comprises at least one tuning apparatus 1016-1, 1016-2 configured to tune one or more of first optical ring resonator 1005, and second optical ring resonator 1006. The at least one tuning apparatus 1016-1, 1016-2 can be configured to tune the respective physical properties and/or respective resonant frequency and/or respective dispersion curve and/or respective insertion loss profile of each of first optical ring resonator 1005, and second optical ring resonator 1006. The at least one tuning apparatus 1016-1, 1016-2 can be configured to control a temperature of one or more of first optical ring resonator 1005 and second optical ring resonator 1006, the at least one tuning apparatus 1016-1, 1016-2 comprising one or more of: at least one temperature control apparatus, at least one heater, at least one cooler, at least one thermoelectric cooler. As depicted, device 1001 comprises a first tuning apparatus 1016-1 configured to tune first optical ring resonator 1005 independent from second optical ring resonator 1006, and a second tuning apparatus 1016-2 configured to tune second optical ring resonator 1006 independent from first optical ring resonator 1005.

In general, each of first optical ring resonator 1005 and second optical ring resonator 1006 are selected to resonate at the same optical carrier frequency. In other words, each of first optical ring resonator 1005 and second optical ring resonator 1006 can be manufactured with a similar diameter; a degree of coupling of each of first optical ring resonator 1005 and second optical ring resonator 1006 to optical throughput bus 1002 can be selected based on techniques similar to those described above with respect to device 201 and system 900.

Further, as described above with reference to FIG. 3, dispersion compensation of under-coupled optical ring resonators and over-coupled optical ring resonators are somewhat different. Nonetheless, by tuning the relative positions of the dispersion peaks of each first optical ring resonator 1005 and second optical ring resonator 1006, more flexible greater dispersion compensation solutions can be achieved as compared to a single under-coupled optical ring resonator.

Figure 11:
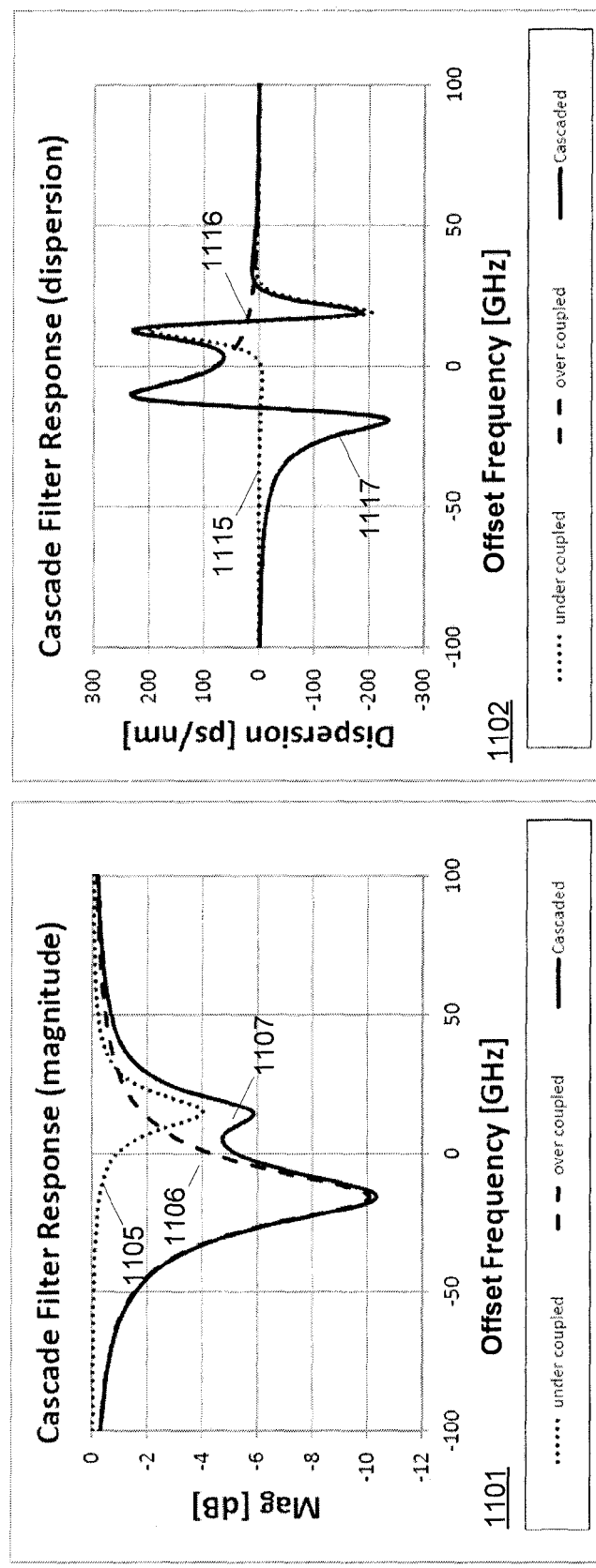
FIG. 11 depicts transmission magnitude and dispersion compensation responses for the device of FIG. 10, according to non-limiting implementations.

For example, attention is next directed to FIG. 11 which depicts graphs 1101, 1102 of, respectively, transmission magnitude profiles and dispersion compensation of device 1001, as a function of offset frequency, when each of first optical ring resonator 1005 and second optical ring resonator 1006 are tuned to respective given physical properties. In graph 1101, transmission magnitude profile 1105 comprises the transmission magnitude profile of first optical ring resonator 1005, while transmission magnitude profile 1106 comprises the transmission magnitude profile of second optical ring resonator 1006 when each are tuned to given physical properties. Combined transmission magnitude profile 1107 comprises the sum of transmission magnitude profiles 1105, 1106 as an optical signal conveyed through optical throughput bus 1002 will experience a combined insertion loss similar to combined transmission magnitude profile 1107.

Similarly, in graph 1102, dispersion curve 1115 comprises the dispersion curve of first optical ring resonator 1005, while dispersion curve 1116 comprises the dispersion curve of second optical ring resonator 1006 when each are tuned to the same given physical properties as in graph 1101. Combined dispersion curve 1117 comprises the sum of dispersion curves 1115, 1116; specifically, an optical signal conveyed through optical throughput bus 1002 will experience combined dispersion compensation similar to combined dispersion curve 1117.

However, in device 1001 each of first optical ring resonator 1005 and second optical ring resonator 1006 can be tuned independent of each other so that each of dispersion curves 1115, 1116 can be moved relative to one another, hence changing a shape of combined dispersion curve 1117; similarly, a shape of combined transmission magnitude profile 1107 can also be changed as dispersion curves 1115, 1116 are tuned.

Figure 12:
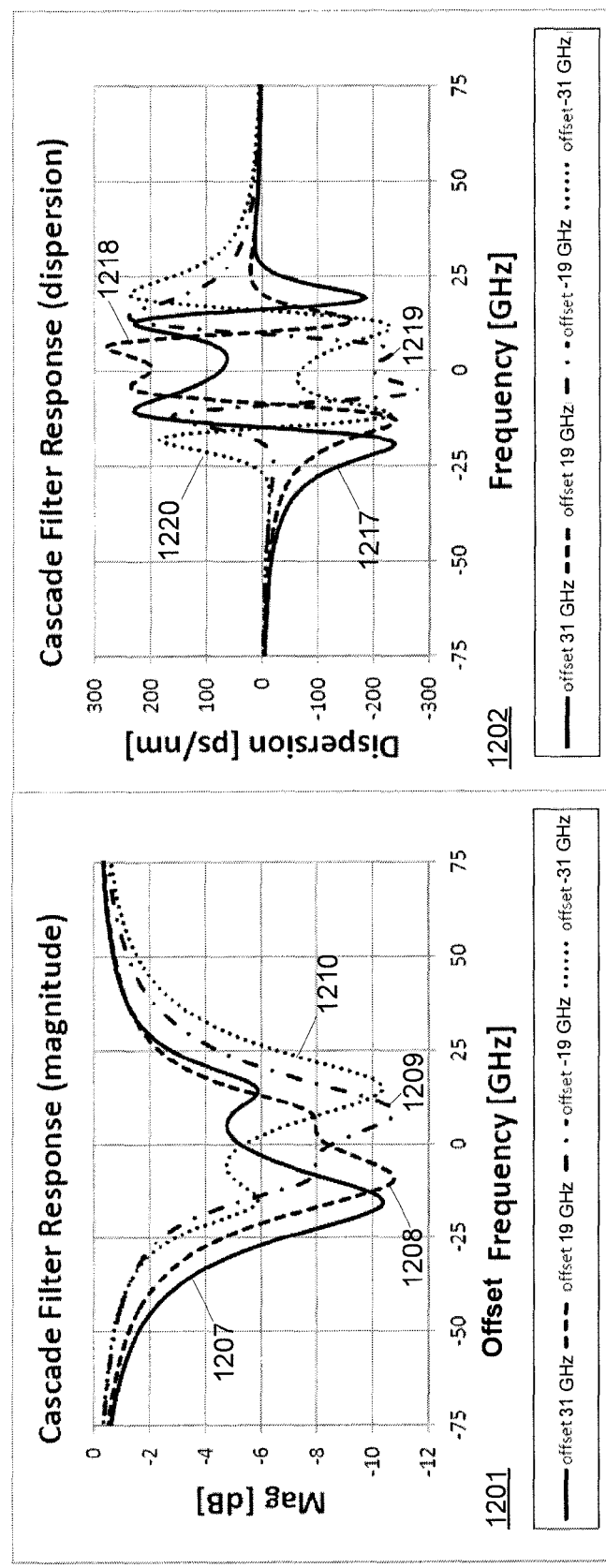
FIG. 12 depicts transmission magnitude and dispersion compensation responses for the device of FIG. 10, as each is tuned, according to non-limiting implementations.

For example, attention is next directed to FIG. 12, which depicts graphs 1201, 1202 of, respectively, combined transmission magnitude profiles 1207, 1208, 1209, 1210, and corresponding combined dispersion curves 1217, 1218, 1219, 1220. Combined transmission magnitude profile 1207 generally corresponds to combined transmission magnitude profile 1107, and combined dispersion curve 1217 generally corresponds to combined dispersion curve 1117. Each of combined dispersion curves 1217, 1218, 1219, 1220 comprise dispersion curves of each of first optical ring resonator 1005 and second optical ring resonator 1006 as an offset between them shifts from 31 GHz to −31 GHz. Hence, at the reference frequency of "0" GHz, the dispersion compensation can change from about 80 ps/nm at a 31 GHz offset, to about 200 ps/nm at a 19 GHz offset, to about −200 ps/nm at a −19 GHz offset, to about −80 ps/nm at a −31 GHz offset. Hence, the dispersion compensation can be tuned.

Further, alignment with an optical carrier frequency of an optical signal can be controlled using both degree of coupling to optical throughout bus 1002 and through tuning using tuning apparatuses 1016-1, 1016-2. Hence, combined dispersion compensation of first optical ring resonator 1005 and second optical ring resonator 1006 can be selected to provide a given dispersion value at given optical carrier frequency, for example by aligning at least a point on one of the combined dispersion curves 1217, 1218, 1219, 1220 with an optical carrier frequency of an optical signal. The tradeoff, however, as compared to device 201, and the like, is that corresponding combined insertion loss is greater than in device 201. In some implementations, the desired dispersion compensation is selected to occur at the "0" GHz reference frequency and/or an optical carrier frequency of an optical signal to be dispersion compensated.

For example in device 1001, under-coupling of first optical ring resonator 1005 to optical throughput bus 1002 and the over-coupling of second optical ring resonator 1006 to optical throughput bus 1002, and the respective physical properties, are selected so that the combined dispersion compensation is between either: about 50 ps/nm and to about 300 ps/nm; or about −50 ps/nm and to about −300 ps/nm, at the reference frequency. Similarly, under-coupling of first optical ring resonator 1005 to optical throughput bus 1002 and the over-coupling of second optical ring resonator 1006 to optical throughput bus 1002, and the respective physical properties, are further selected so that insertion loss due to the combined insertion loss profile is between about 4 dB and about 8 dB, as compared to between about 1 dB and about 7 dB in device 201, as described above. However, other ranges of dispersion compensation and insertion loss are within the scope of present implementations. For example, the presently described ranges can be suitable for optical signals with bit rates around 28 Gb/s; however, for lower bit rates, physical properties and coupling of first optical ring resonator 1005 and second optical ring resonator 1006 can be selected that results in higher dispersion compensation, though a tradeoff can be that the resulting dispersion peaks can be narrower and/or the resulting dispersion curves can have a narrower spectrum than as depicted herein.

In some implementations, physical properties of optical ring resonators 1005, 1006 can be tuned until an optical signal received at device 1001 exhibits a desired ROSNR.

Figure 13:
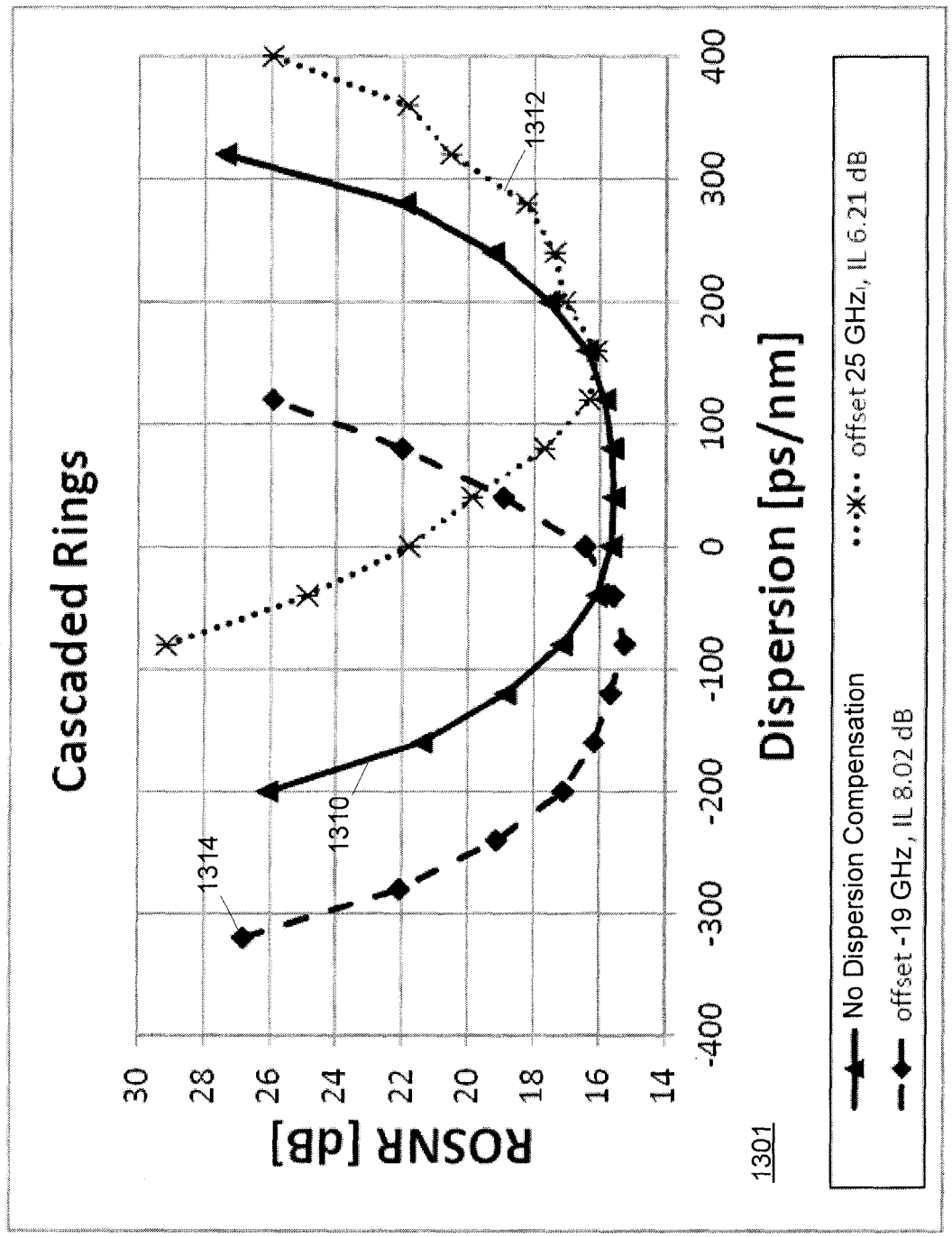
FIG. 13 depicts a graph of simulations of ROSNR received at a given receiver, for the device of FIG. 10, according to non-limiting implementations.

For example, attention is next directed to FIG. 13 which depicts a graph 1301 of ROSNR as a function of dispersion, similar to FIG. 5, of a given receiver, such as receiver 105, for the case of no dispersion compensating structure (curve 1310), for a 25 GHz relative offset of the two resonators, with the under-coupled ring at +12.5 GHz offset from the signal frequency and the over-coupled ring at −12.5 GHz from the signal frequency (curve 1312), and for a −19 GHz relative offset of the two resonators, with the under-coupled ring at −9.5 GHz offset from the signal frequency and the over-coupled ring at +9.5 GHz from the signal frequency (curve 1314). Again using a 20 dB figure of merit, the dispersion window can be shifted from between about −140 ps/nm and about 250 ps/nm, to between about −250 ps/nm and about +310 ps/nm (i.e. low and high 20 dB points for curves 1314, 1312, respectively) under a particular set of tuning conditions.

Figure 14:
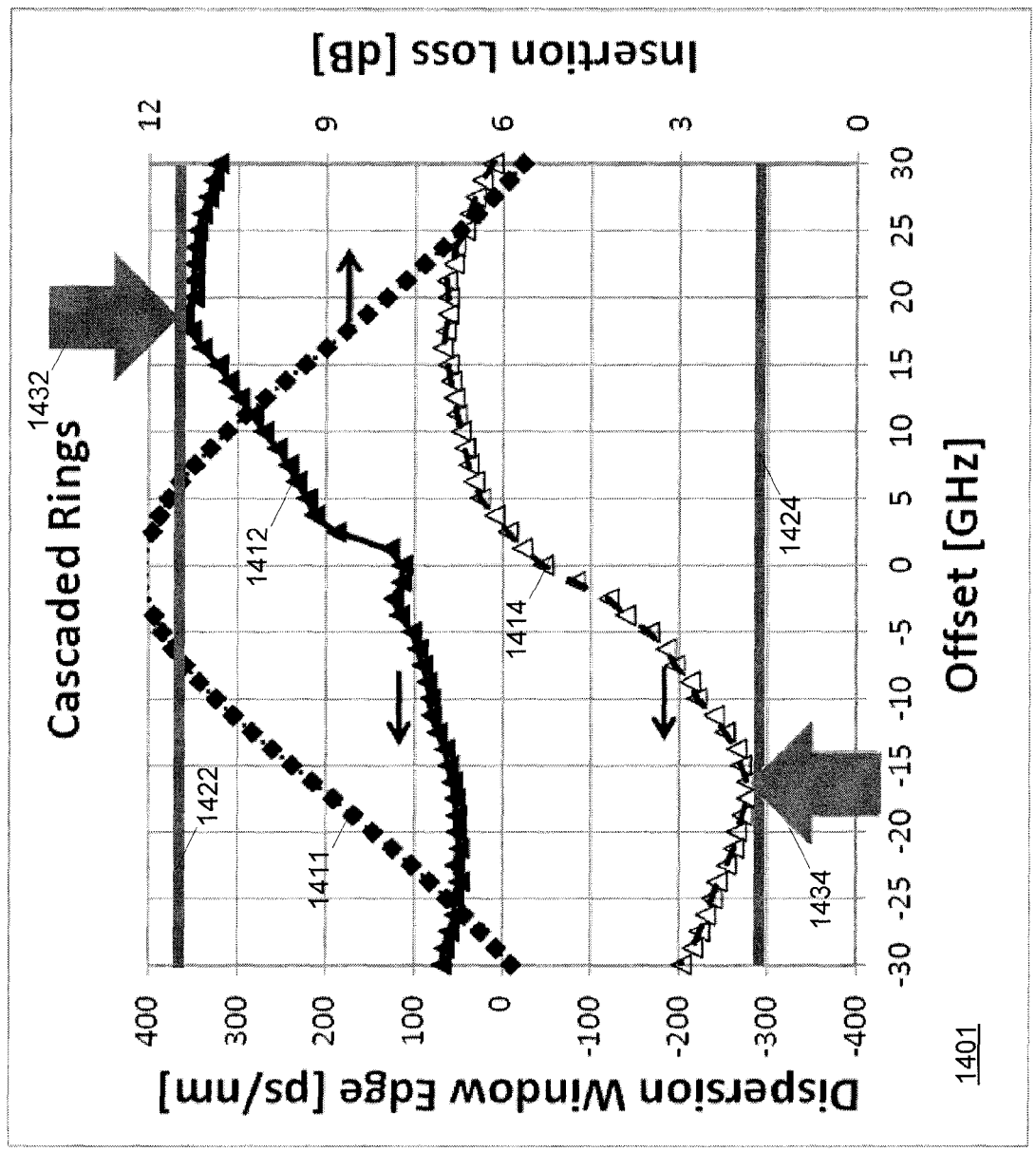
FIG. 14 depicts a graph of an insertion loss profile as a function of offset frequency of the device of FIG. 10, and dispersion window edge curves at 20 dB ROSNR corresponding to curves of FIG. 13, according to non-limiting implementations.

The change in the dispersion window edge as a function of offset for each of curves 1312, 1314 is depicted in a graph 1401 in FIG. 14, similar to FIG. 6, with curve 1412 showing the high dispersion window edge for which ROSNR is 20 dB as a function of offset frequency for the continuous series of curves represented by example curves 1312 and 1314, and curve 1414 showing the low dispersion window edge for which ROSNR is 20 dB as a function of offset frequency for the continuous series of curves represented by example curves 1312 and 1314. Insertion loss 1411 of a trace of insertion loss values at 0 GHz in FIG. 12 is also shown. Also shown are the peak dispersion values corresponding to the points for which ROSNR is 20 dB (lines 1422, 1424), which can be tuned over more than a 400 ps/nm range, as indicated at arrows 1432, 1434. However, the losses at the 20 dB edges can be very high, for example between about 8.5 dB and about 9 dB. Hence, device 1001 can be used in systems where lower powers are tolerated.

While not depicted, it is appreciated that device 1001 can be modified similar to device 801 so that device 1001 can further comprise a plurality of pairs of under-coupled optical ring resonators and over-coupled optical ring resonators on the optical throughput bus, each of the plurality of pairs tuned to a different optical carrier frequency.

Furthermore, device 1001 can be a standalone device, controllable using computing device 119, and/or integrated with receiver 105 and/or integrated with device 115.

Design and tuning of device 1001 can proceed similar to system 900, so that simulations can be used to choose the degree of coupling of each of first optical ring resonator 1005 and second optical ring resonator 1006 for a given optical carrier frequency, the device manufactured using PICs and then tuned in the field using computing device 119 and tuning apparatuses 1016-1, 1016-2.

In yet further implementations, optical ring resonators can also be used to both provide dispersion compensation and de-multiplexing of optical signals.

Figure 15:
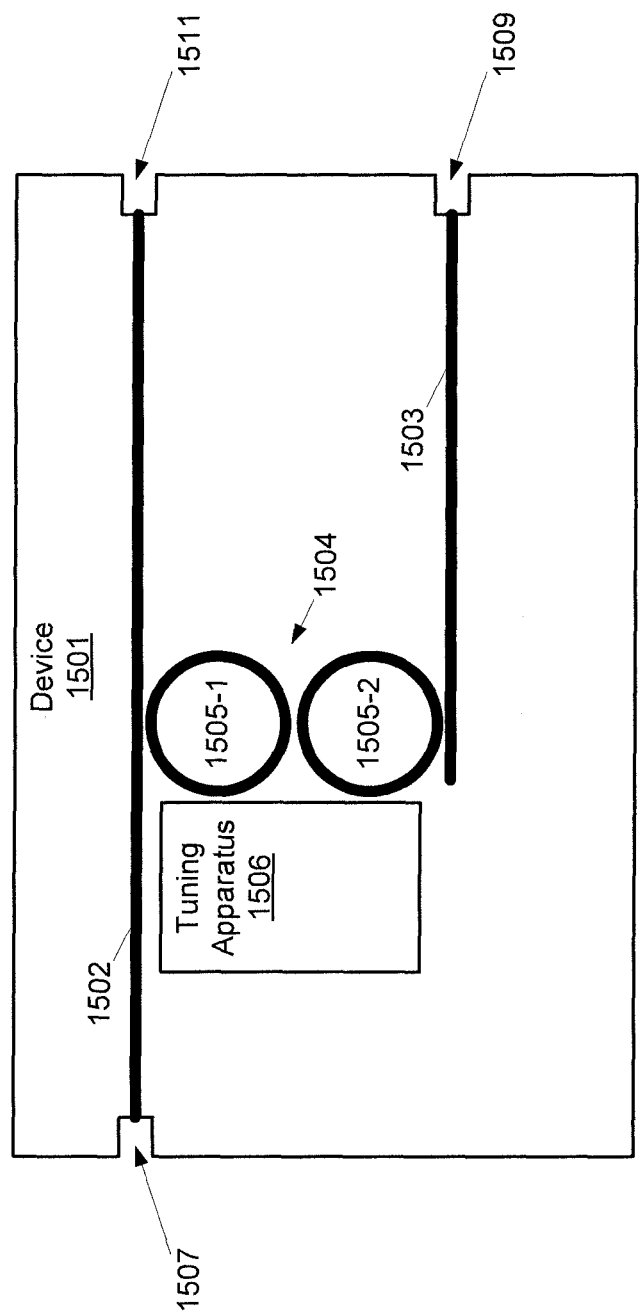
FIG. 15 depicts a schematic diagram of a device for tuning dispersion compensation and demultiplexing a given optical signal, according to alternative non-limiting implementations.

For example, attention is next directed to FIG. 15 which depicts a device 1501 similar to device 201, with like elements having like numbers, however with a "15" preceding each number rather than a "2". Device 101 can comprise device 1501, however device 1501 is configured to both provide dispersion compensation for an optical signal at a given optical carrier frequency, and demultiplex the optical signal from a plurality of optical signals.

Device 1501 comprises: an optical input bus 1502 configured to convey a given optical input signal having a given optical carrier frequency and a given data rate; an optical output bus 1503; and, an optical ring resonance structure 1504 comprising one or more optical ring resonators 1505-1, 1505-2 arranged in series between optical input bus 1502 and optical output bus 1503, physical properties, and coupling of optical ring resonance structure 1504 to optical input bus 1502, optical output bus 1503, and between the one or more optical ring resonators 1505-1, 1505-2 selected so that: a centre of an insertion loss profile of the optical ring resonance structure 1504 is between the given optical carrier frequency and a first minimum of the given optical input signal, the insertion loss profile having a bandwidth at least about two thirds of the given data rate, so that a side band of the given optical input signal dominates an optical output signal conveyed from optical input bus 1502 to optical output bus 1503; and, a dispersion peak of optical ring resonance structure 1504 about aligns with the given optical carrier frequency.

As depicted, optical ring resonance structure 1504 comprises a first optical ring resonator 1505-1 and a second optical ring resonator 1505-2 arranged in series between optical input bus 1502 and optical output bus 1503. Coupling of optical ring resonators 1505-1, 1505-2 can be selected based on a desired range of dispersion compensation tuning. Furthermore, in some implementations, optical ring resonance structure 1504 can comprise as few as one optical ring resonator for example in systems with a few widely spaced channels. In other implementations, optical ring resonance structure 1504 can comprise more than two optical ring resonators. In general, a number of optical ring resonators in optical ring resonance structure 1504 can be selected based on desired dispersion compensation and/or insertion loss of optical ring resonance structure 1504 in a design phase.

While, as depicted each of first optical ring resonator 1505-1 and second optical ring resonator 1505-2 are further coupled to each other, in other implementations, each of first optical ring resonator 1505-1 and second optical ring resonator 1505-2 can be coupled to an intermediate drop port there between. When optical ring resonance structure 1504 comprises more than two optical ring resonators, optical ring resonance structure 1504 can comprise a drop port between adjacent optical ring resonators, though some adjacent optical ring resonators can be coupled to each other and not via a drop port. In other words, the one or more optical ring resonators 1505-1, 1505-2 can alternatively be arranged in series via one or more drop ports.

Device 1501 further comprises an optical input device 1507 connected to optical input bus 1502, optical input device 1507 configured to receive an optical fiber, the optical fiber configured to convey the given optical input signal to optical input bus 1502. Device 1501 further comprises an optical output device 1509 connected to optical output bus 1503, optical output device 1509 configured to convey the optical output signal to one or more of: an optical fiber and an optical receiver, such as receiver 105.

As depicted, device 1501 further comprise a second optical output device 1511 connected to optical input bus 1502. As described below, optical resonance structure 1504 is configured to de-multiplex a given carrier channel from optical input bus 1502; hence, second optical output device 1511 conveys the remaining carrier channels to another optical fiber and/or receiver 105 and/or another demuliplexer and/or a light dump.

As depicted, device 1501 further comprises a tuning apparatus 1506, similar to tuning apparatus 206, configured to tune the optical ring resonance structure 1504. Specifically, tuning apparatus 1506 is configured to tune physical properties of optical ring resonance structure 1504, for example refractive indices of optical ring resonators 1505-1, 1505-2. Hence, similar to tuning apparatus 206, tuning apparatus 1506 can be configured to control a temperature of optical ring resonance structure 1504, and tuning apparatus 1506 can comprise one or more of: a temperature control apparatus, a heater, a cooler, and a thermoelectric cooler.

Furthermore, device 1501 can be integrated with receiver 105 and/or device 115.

Figure 16:
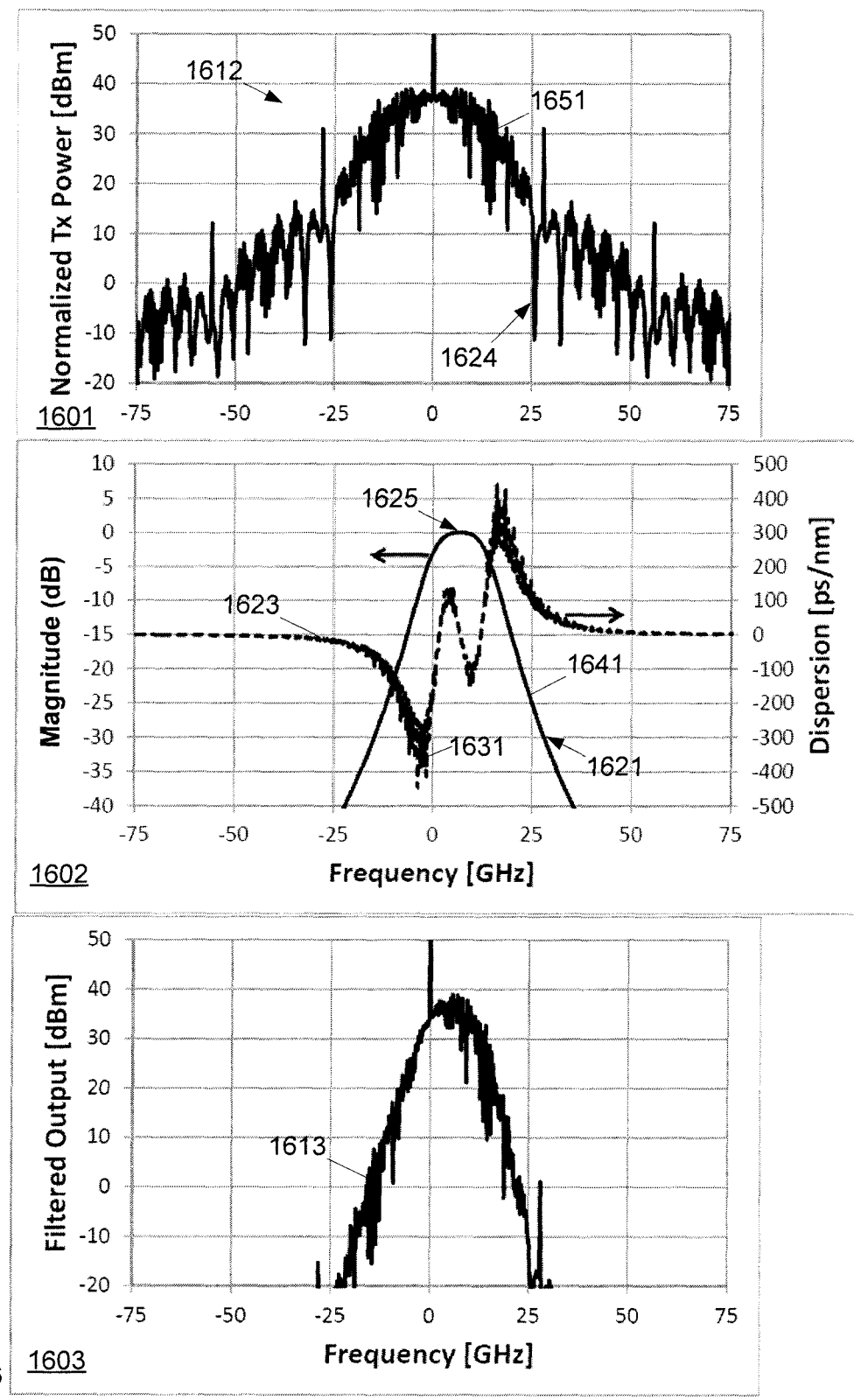
FIG. 16 depicts an example optical input signal to the device of FIG. 15, an example optical output signal, and a transmission magnitude profile and a dispersion curve for the device of FIG. 15, according to non-limiting implementations.

Attention is next directed to FIG. 16, which depicts three graphs 1601, 1602, 1603 which depict the centre of an insertion loss profile of the optical ring resonance structure 1504 being between a given optical carrier frequency and a first minimum of a given optical input signal, and, a dispersion peak of optical ring resonance structure 1504 about aligning with the given optical carrier frequency.

Specifically, graph 1601 depicts an optical input signal 1612 of a given optical carrier channel before being dispersion compensated by device 1501 and graph 1603 depicts an optical output signal 1613 after being dispersion compensated by device 1501. In other words, optical signals 1612, 1613 respectively correspond to optical signals 111, 113 of FIG. 1; furthermore, optical output signal 1613 comprises optical input signal 1612 after optical input signal 1612 interacts with device 1501 (e.g. after optical input signal 1612 interacts with optical ring resonance structure 1504 and is demultiplexed from other carrier channels being conveyed on optical input bus 1502).

In particular, optical input signal 1612 comprises a peak at a given optical carrier frequency, labelled "0" in FIG. 16 as a reference frequency, and a first minimum 1624; while there is a first minimum on either side of the optical carrier frequency, each located at the given data rate, only one is labelled.

Further, graph 1602 depicts an example transmission magnitude profile 1621 and an example dispersion curve 1623 of optical ring resonance structure 1504. A centre 1625 of transmission magnitude profile 1621 is selected so that centre 1625 is located between the given optical carrier frequency of optical input signal and first minimum 1624; further; a bandwidth of insertion loss profile 1621 is selected that is at least about two thirds of the given data rate. Hence, for example, if the given data rate is about 28 Gb/s (as depicted), then the bandwidth of transmission magnitude profile 1621 is at least about 19 GHz, so that a side band (that includes the indicated first minimum 1624) dominates optical output signal 1613 conveyed from optical input bus 1502 to optical output bus 1503.

Furthermore, a dispersion peak 1631 of dispersion curve 1623, of optical ring resonance structure 1504 is selected to about align with the given optical carrier frequency. As depicted in FIG. 16 exact alignment need not occur, for example peak 1631 is within about 5 GHz of the given optical carrier frequency, and indeed a position of peak 1631 can be tuned using tuning apparatus 1506.

Further, while dispersion curve 1623 comprises more than one peak (e.g. two positive peaks and two negative peaks), the signal and dispersion profiles are aligned using tuning apparatus 1506 that maximizes and/or optimizes the dispersion compensating effect of curve 1623 on signal 1621 and that also causes a centre of transmission magnitude profile 1621 to be located between the given optical carrier frequency and first minimum 1624. The total effect of the dispersion compensation is determined as described above.

From FIG. 16, it is also appreciated that a portion of an edge 1641 of transmission magnitude profile 1621 one or more of: intersects a respective edge 1651 of given optical signal 1612; and is about aligned with respective edge 1651 of given optical signal 1612, respective edge 1651 of given optical input signal 1612 located between the given optical carrier frequency and first minimum 1624 of given optical input signal 1612.

From graph 1603 it is apparent that the resulting optical output signal 1613: has eliminated a substantial portion of a side band as compared to optical input signal 1612 (e.g. the side band less than the optical carrier frequency); and has been dispersion compensated with respect to optical input signal 1612. Furthermore, data encoded in optical input signal 1612 remains encoded in optical output signal 1613.

A bandwidth of transmission magnitude profile 1621 is about two thirds the data rate of optical input signal 1612; the bandwidth of transmission magnitude profile 1621 can further exclude other given optical signals, adjacent in optical carrier frequency to given optical signal 1612, that can also be conveyed on optical input bus 1502, the other given optical signals and the given optical signal 1612 each comprising a data channel on the optical input bus. For example, with reference to FIG. 7, if given optical signal 1612 is analogous to optical signal 703-2, then a bandwidth of transmission magnitude profile 1621 is selected to exclude optical signals 703-1, 703-3 from transmission through optical ring resonance structure 1504.

In some implementations, frequency of a resonant dispersion peak can be tuned, for example, using temperature of optical ring resonance structure 1504 until an optical signal received at device 1501 exhibits a desired ROSNR; in other words, physical properties of optical ring resonance structure 1504, such as index of refraction, can be tuned using temperature to in turn tune a position of dispersion peak 1631 and/or another dispersion peak. In other words, similar to devices 201, 1001, a shape of dispersion curve 1623 and transmission magnitude profile 1621 are determined when designing and/or fabricating device 1501, and an alignment of a dispersion peak with an optical signal is performed using tuning apparatus 1506.

Figure 17:
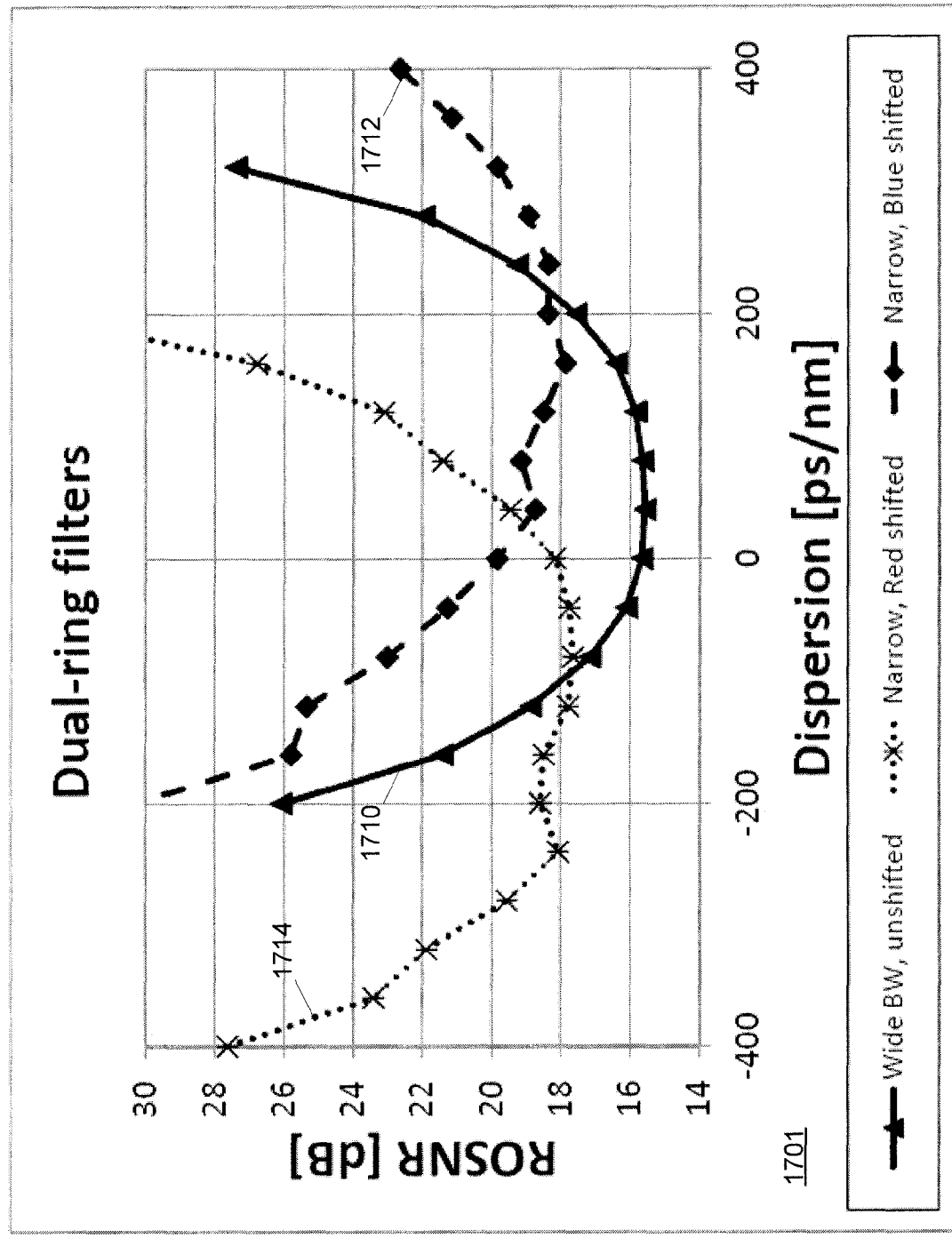
FIG. 17 depicts a graph of simulations of ROSNR at a given receiver, for the device of FIG. 15, according to non-limiting implementations.

For example, attention is next directed to FIG. 17 which depicts a graph 1701 of ROSNR as a function of dispersion, similar to FIG. 5, of a given receiver, such as receiver 105; depicted are: an ROSNR vs. dispersion curve 1710 of a wideband bandwidth filter (e.g. a filter with a transmission magnitude profile that includes transmission of both sidebands of an optical carrier signal); a curve 1712 for a blue shifted filter similar to the filter depicted in graph 1602 (e.g. peak 1631 dispersion curve 1623 is shifted towards a lower frequency); and a curve 1714 for a red shifted filter similar to the filter depicted in graph 1602 (e.g. peak 1631 dispersion curve 1623 is shifted towards a higher frequency and/or or the greatest intensity negative dispersion peak is about aligned with the optical carrier frequency).

Again using a 20 dB figure of merit for ROSNR, the dispersion window can be shifted from between about −120 ps/nm and about 250 ps/nm for the wideband filter, to between −280 ps/nm and about +310 ps/nm (i.e. low and high 20 dB points for curves 1714, 1712, respectively) for the single side band filter, under a particular set of tuning conditions.

Figure 18:
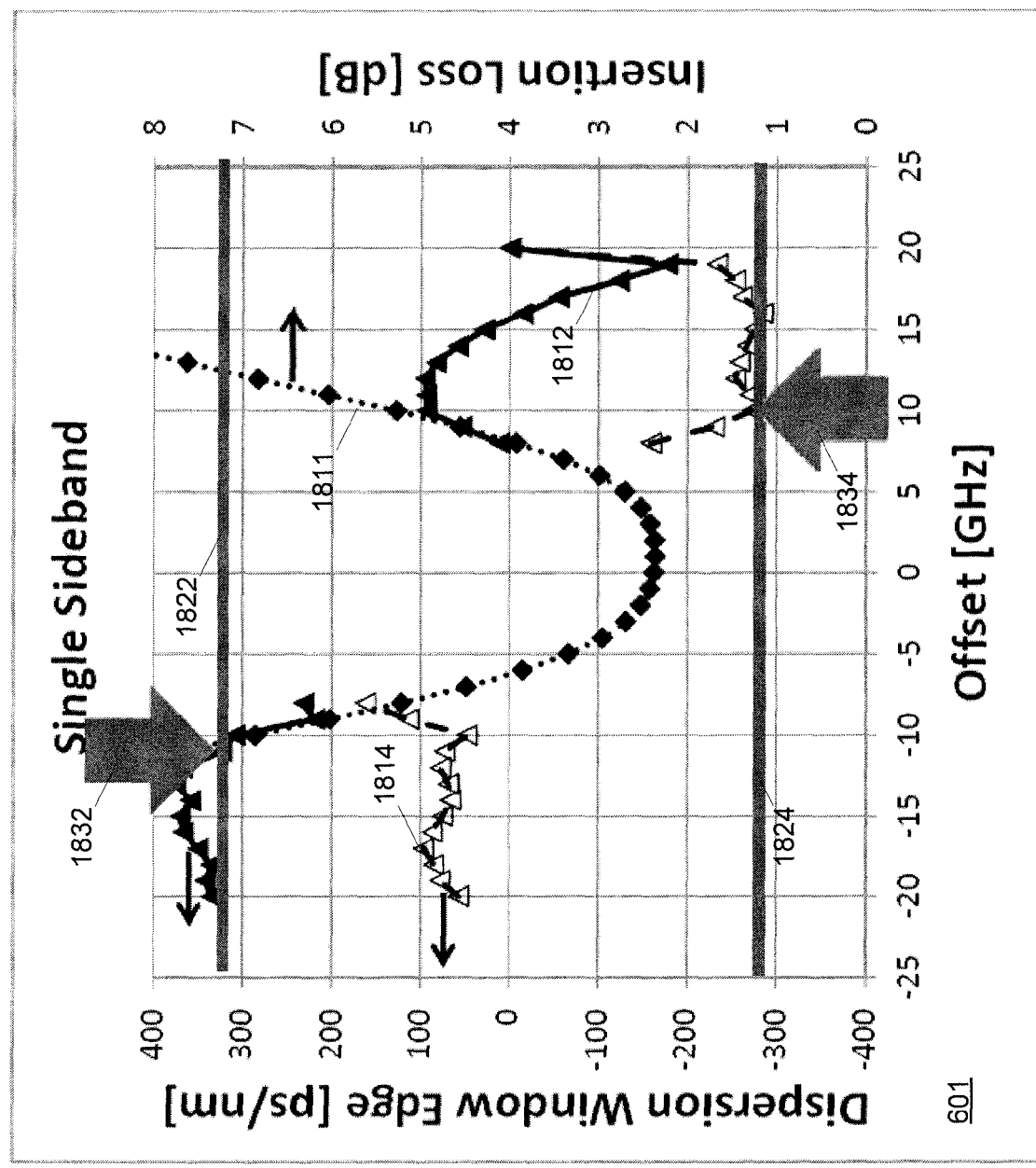
FIG. 18 depicts a graph of an insertion loss profile as a function of offset frequency of the device of FIG. 15, and dispersion window edge curves at 20 dB ROSNR corresponding to curves of FIG. 17, according to non-limiting implementations.

The change in the dispersion window edge as a function of offset for each of curves 1712, 1714 is depicted in FIG. 18, similar to FIG. 6, with curve 1812 showing the high dispersion window edge for which ROSNR is 20 dB as a function of offset frequency for the continuous series of curves represented by example curves 1712 and 1714, and curve 1814 showing the low dispersion window edge for which ROSNR is 20 dB as a function of offset frequency for the continuous series of curves represented by example curves 1712 and 1714. Insertion loss 1811 is also shown. Also shown are the 20 dB points of ROSNR (lines 1822, 1824), which encompass almost a 600 ps/nm range, as indicated at arrows 1832, 1834 (with curve 1814 and arrow 1832 on a blue shifted edge and curve 1812 and arrow 1834 on a red-shifted edge). However, the losses at the blue shifted edge can be very high, for example between about 7 dB and about 8 dB. Losses at the red shifted edge are relatively lower, for example between about 4 dB to about 5 dB. Hence, in general, device 1501 can be used in systems where positive dispersion is present and negative dispersion compensation is to be implemented. However, by selecting different coupling parameters and/or different tuning conditions for optical ring resonance structure 1504, device 1501 can be modified to provide positive dispersion compensation within an acceptable insertion loss window, for example less than 6 to 7 dB.

Indeed, physical properties and coupling of optical ring resonance structure 1504 to optical input bus 1502, optical output bus 1503, and between one or more optical ring resonators 1505-1, 1505-2 can be selected so that dispersion compensation of one or more of the dispersion peaks of optical ring resonance structure 1504 is between either: about 150 ps/nm and to about 300 ps/nm; or about −150 ps/nm and to about −300 ps/nm. Further, the physical properties and coupling of optical ring resonance structure 1504 to optical input bus 1502, optical output bus 1503, and between one or more optical ring resonators 1505-1, 1505-2 can be selected so that insertion loss due to the insertion loss profile is between about 1 dB and about 7 dB. However, other ranges of dispersion compensation and insertion loss are within the scope of present implementations. For example, the presently described ranges can be suitable for optical signals with bit rates around 28 Gb/s; however, for lower bit rates, physical properties and coupling of optical ring resonance structure 1504 can be selected that results in higher dispersion compensation, though a tradeoff can be that the resulting dispersion peaks can be narrower and/or the resulting dispersion curves can have a narrower spectrum than as depicted herein.

Furthermore, computing device 119 can be used to tune tuning apparatus 1506 to a given temperature that corresponds to a given dispersion peak position.

Device 1501 can be modified to compensate for dispersion for a plurality of optical carrier frequencies and/or a plurality of optical channels.

Figure 19:
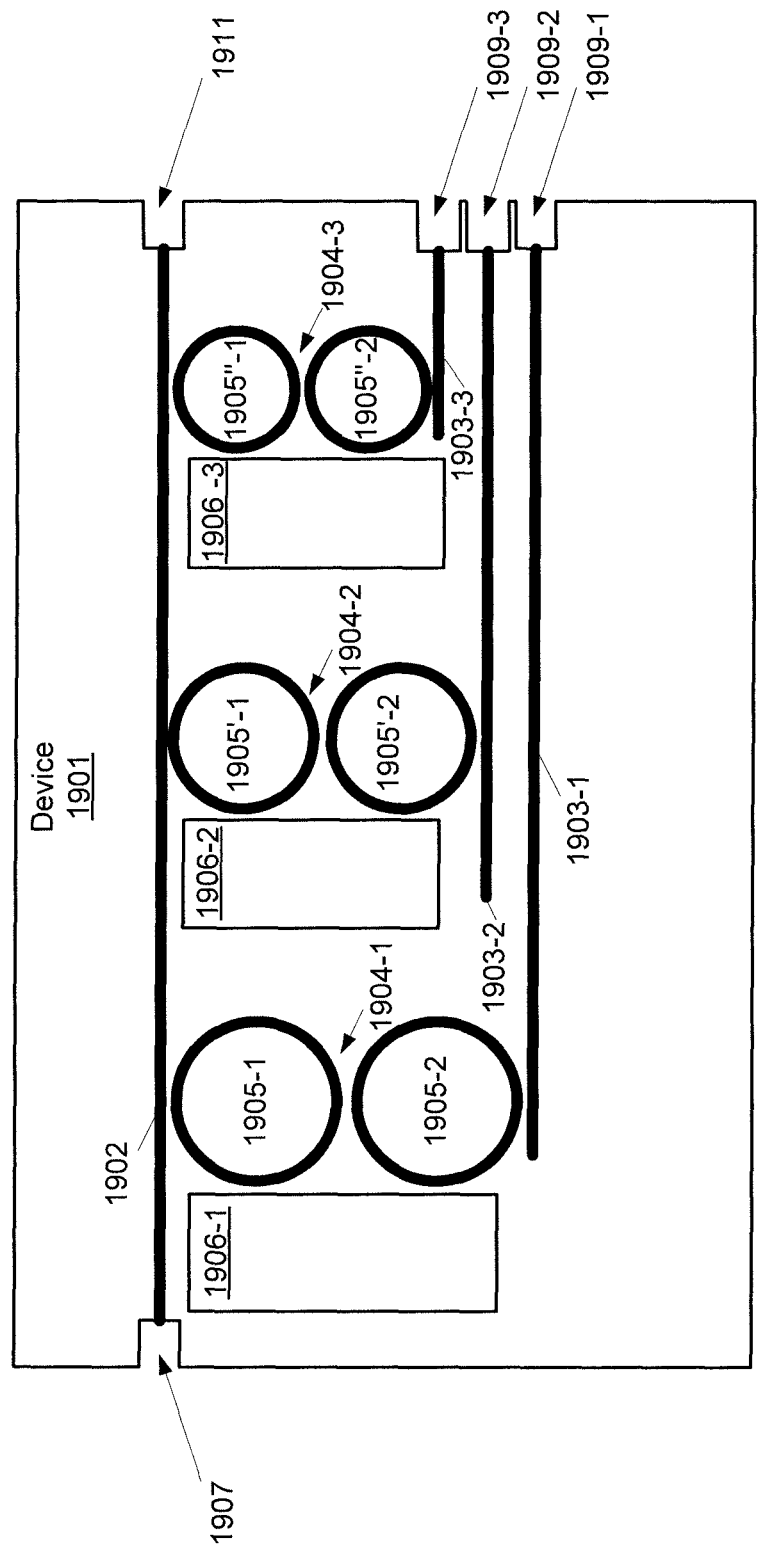
FIG. 19 depicts a schematic diagram of a device for tuning dispersion compensation and demultiplexing for a plurality of optical signals, according to alternative non-limiting implementations.

For example, attention is next directed to FIG. 19, which depicts a device 1901, similar to device 1501, with like elements having like numbers, however with a "19" preceding each number rather than a "15". Hence, device 1501 comprises; an optical input bus 1902, a plurality of optical ring resonance structures 1904-1, 1904-2, 1904-3 and a plurality of optical output buses 1903-1, 1903-2, 1903-3, in a one to one relationship, each of the plurality of optical ring resonance structures 1904-1, 1904-2, 1904-3 coupling optical input bus 1902 to a respective optical output bus 1903-1, 1903-2, 1903-3 each of the plurality of optical ring resonance structures 1904-1, 1904-2, 1904-3 tuned to a different optical carrier frequency. For example, each optical ring resonance structures 1904-1, 1904-2, 1904-3 comprises a respective pair of optical ring resonators (e.g. optical ring resonance structure 1904-1 comprises optical ring resonators 1905-1, 1905-2, optical ring resonance structure 1904-2 comprises optical ring resonators 1905'-1, 1905'-2, and optical ring resonance structure 1904-3 comprises optical ring resonators 1905"-1, 1905"-2), similar to optical ring resonance structure 1504. Each respective pair of optical ring resonators have diameters that can be similar to each other but different from optical ring resonators at other optical ring resonance structures 1904-1, 1904-2, 1904-3 at device 1901 so that each optical ring resonance structures 1904-1, 1904-2, 1904-3 is tuned to a different optical carrier frequency and/or a different channel.

Hence, each optical ring resonance structures 1904-1, 1904-2, 1904-3 is configured to demultiplex a respective optical carrier frequency and/or a respective channel.

Device 1901 further comprises tuning apparatuses 1906-1, 1906-2, 1906-3 in a one-to-one relationship with optical ring resonance structures 1904-1, 1904-2, 1904-3, each tuning apparatus 1906-1, 1906-2, 1906-3 configured to tune a respective optical ring resonance structure 1904-1, 1904-2, 1904-3 independent from one another.

Device 1901 further comprises a plurality of optical output devices 1909-1, 1909-2, 1909-3 connected to respective optical output buses 1903-1, 1903-2, 1903-3, the plurality of optical output devices 1909-1, 1909-2, 1909-3 configured to convey respective optical output signals to one or more of: an optical fiber and an optical receiver for example receiver 1905.

As each optical ring resonance structures 1904-1, 1904-2, 1904-3 is configured to demultiplex a respective optical carrier frequency and/or a respective channel, output signals from each the plurality of optical output devices c1909-1, 1909-2, 1909-3 can be transmitted via a different fiber optic cable to a respective receiver for each channel, and/or connected to a respective receiver for each channel using a PIC structure.

As depicted, device 1901 further comprises a second optical output device 1911 connected to optical input bus 1902. As described above, each optical resonance structure 1904-1, 1904-2, 1904-3 is configured to de-multiplex a respective carrier channel from optical input bus 1902; hence, second optical output device 1911 conveys the remaining carrier channels to another optical fiber and/or receiver 105 and/or another demuliplexer and/or a light dump.

While only three optical ring resonance structures 1904-1, 1904-2, 1904-3 are depicted in FIG. 19, device 1901 can comprise any number of optical ring resonance structures, for example an optical ring resonance structures for each channel for which dispersion compensation and demultiplexing is to be provided. Further, while optical ring resonance structures

1904-1, 1904-2, 1904-3 are depicted as being of different sizes, this is done for clarity only to show separation of optical output buses 1903-1, 1903-2, 1903-3 from one another; in practice each optical ring resonance structures 1904-1, 1904-2, 1904-3 can be similar to or different from one another, however tuned to different physical properties and/or different temperatures and/or different dispersion peak positions.

Further, while not depicted, each tuning apparatus 1906-1, 1906-2, 1906-3 comprises an interface to computing device 119, or the like, similar to tuning apparatus 206; hence, each tuning apparatus 1906-1, 1906-2, 1906-3 can be tuned independently of each other.

Devices 1501, 1901 have both been described with respect to pairs of optical ring resonators arranged in series between an optical input bus and an optical output bus. In other implementations, however, more than two optical ring resonators can be arranged in series. Further, in some implementations, one or more of optical ring resonance structures 1504, 1904-1, 1904-2, 1904-3 can comprise one respective optical ring resonator.

Furthermore, while tuning herein as been described with computing device 119 tuning dispersion compensation of devices 101, 201, 801, 1501, 1901, for example by manually and/or automatically selecting dispersion compensation settings, in other implementations, forward error correction (FEC) can be used to provide feedback on the dispersion compensation, e.g. in a feedback loop. For example, FEC can be implemented at receiver 105 to determine an error rate in a dispersion compensated signal, and further tuning of devices 101, 201, 801, 1501, 1901 can occur using FEC; for example, while not depicted, receiver 105 can be in communication with computing device 119, and application 145 can be adapted to tweak and/or further tune dispersion compensation at devices 101, 201, 801, 1501, 1901 based on the FEC in a feedback loop.

In any event, provided herein are tunable dispersion compensation devices that are based on optical ring resonators under-coupled to optical throughout buses and/or optical input buses. The degree of dispersion compensation can be selected by controlling the degree of under-coupling and by tuning physical properties of the optical ring resonators. In a first implementation, an optical ring resonator under-coupled to an optical throughput bus can be used to provide positive dispersion compensation or negative dispersion compensation depending on tuning of the optical ring resonator, which widens the dispersion window. In a second implementation, an over-coupled optical ring resonator can be added to the optical throughput bus to provide a cascaded filter; while this provides more flexibility in tuning, insertion losses can be higher than the single optical ring resonator filter. In a third implementation optical ring resonators arranged in series between an optical input bus and an optical output bus can be used to both tune dispersion compensation and provide demultiplexing.

Those skilled in the art will appreciate that in some implementations, the functionality of computing device 119 can be implemented using pre-programmed hardware or firmware elements (e.g., application specific integrated circuits (ASICs), electrically erasable programmable read-only memories (EEPROMs), etc.), or other related components. In other implementations, the functionality of computing device 119 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency (RF), microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   an optical input bus configured to convey a given optical input signal having a given optical carrier frequency and a given data rate;
   an optical output bus; and,
   an optical ring resonance structure comprising one or more optical ring resonators arranged between the optical input bus and the optical output bus,
   physical properties and coupling of the optical ring resonance structure to the optical input bus, the optical output bus, and between the one or more optical ring resonators selected so that:
   a centre of an insertion loss profile of the optical ring resonance structure is between the given optical carrier frequency and a first minimum of the given optical input signal, the insertion loss profile having a bandwidth at least about two thirds of the given data rate, so that a side band of the given optical input signal dominates an optical output signal conveyed from the optical input bus to the optical output bus; and,
   a dispersion peak of the optical ring resonance structure about aligns with the given optical carrier frequency.

2. The device of claim 1, wherein the optical ring resonance structure comprises a first optical ring resonator and a second optical ring resonator arranged in series between the optical input bus and the optical output bus, the first optical ring resonator coupled to the optical input bus, and the second optical ring resonator coupled to the optical output bus.

3. The device of claim 1, wherein the bandwidth of the insertion loss profile excludes other given optical signals, adjacent to the given optical input signal, conveyed on the optical input bus, the other given optical signals and the given optical input signal each comprising a data channel on the optical input bus.

4. The device of claim 1, wherein a portion of an edge of the insertion loss profile one or more of: intersects a respective edge of the given optical input signal; and is about aligned with the respective edge of the given optical input signal, the portion of the edge of the insertion loss profile located between the given optical carrier frequency and the first minimum of the given optical input signal.

5. The device of claim 1, wherein the physical properties and the coupling of the optical ring resonance structure to the optical input bus, the optical output bus, and between the one or more optical ring resonators are further selected so that dispersion compensation of the dispersion peak is between either: about 150 ps/nm and to about 300 ps/nm; or about −150 ps/nm and to about −300 ps/nm.

6. The device of claim 1, wherein the physical properties and the coupling of the optical ring resonance structure to the optical input bus, the optical output bus, and between the one or more optical ring resonators are further selected so that a total insertion loss due to the insertion loss profile is between about 1 dB and about 7 dB.

7. The device of claim 1, further comprising an optical input device connected to the optical input bus, the optical input device configured to receive an optical fiber, the optical fiber configured to convey the given optical input signal to the optical input bus.

8. The device of claim 1, further comprising an optical output device connected to the optical output bus, the optical output device configured to convey the optical output signal to one or more of: an optical fiber and an optical receiver.

9. The device of claim 1, wherein the one or more optical ring resonators are arranged in series via one or more drop ports.

10. The device of claim 1, further comprising a plurality of optical ring resonance structures and a plurality of optical output buses, in a one to one relationship, each of the plurality of optical ring resonance structures coupling the optical input bus to a respective optical output bus, of the plurality of optical output buses, each of the plurality of optical ring resonance structures tuned to a different optical carrier frequency.

11. The device of claim 1, further comprising a plurality of optical output devices connected to respective optical output buses, the plurality of optical output devices configured to convey respective optical output signals to one or more of: an optical fiber and an optical receiver.

12. The device of claim 1, further comprising an optical receiver in communication with the optical output bus.

13. The device of claim 1, further comprising a tuning apparatus configured to tune the optical ring resonance structure.

14. The device of claim 13, wherein the tuning apparatus is configured to tune the physical properties of optical ring resonance structure.

15. The device of claim 13, wherein the tuning apparatus is configured to control a temperature of the optical ring resonance structure, the tuning apparatus comprising one or more of: a temperature control apparatus, a heater, a cooler, and a thermoelectric cooler.

16. A device comprising:
an optical input device; an optical output device;
an optical throughput bus configured to convey a given optical input signal having a given optical carrier frequency and a given data rate from the optical input device to the optical output device; and
an optical ring resonator coupled to the optical throughput bus, between the optical input device and the given optical input signal from the optical input bus to the optical ring resonator, the optical ring resonator configures to filter the given optical input signal from the optical input device to produce an optical output signal that is conveyed by the optical throughput bus to the optical output device, the coupling and physical properties of the optical ring resonator selected so that:

a dispersion peak of the optical ring resonator about aligns with the given optical carrier frequency; and,
a centre of an insertion loss profile of the optical ring resonator is between the given optical carrier frequency and a first minimum of the given optical input signal, the insertion loss profile having a bandwidth at least about two thirids of the given data rate, so that a side band of the given optical input dominates the optical output signal conveyed to the optical output device.

17. The device of claim 16, wherein the bandwidth of the insertion loss profile excludes other given optical signals, adjacent in optical carrier frequency to the given optical input signal, conveyed on the optical throughput bus, the other given optical signals and the given optical input signal each comprising a data channel on the optical throughput bus.

18. The device of claim 16, wherein the physical properties and the coupling of the optical ring resonator to the optical throughput bus are further selected so that dispersion compensation of the dispersion peak is between either: about 150 ps/nm and to about 300 ps/nm; or about −150 ps/nm and to about −300 ps/nm.

19. The device of claim 16, wherein the physical properties and the under-coupling of the optical ring resonator to the optical throughput bus are further selected so that a total insertion loss due to the insertion loss profile is between about 1 dB and about 7 dB.

20. The device of claim 16, wherein the optical input device is configured to receive an optical fiber, the optical fiber configured to convey the given optical input signal to the optical throughput bus.

21. The device of claim 16, wherein the optical output device is configured to convey the optical output signal to one or more of: an optical fiber and an optical receiver.

22. The device of claim 16, further comprising a plurality of optical ring resonators coupled to the optical throughput bus, each of the plurality of optical ring resonators tuned to a different optical carrier frequency.

23. The device of claim 16, further comprising an optical receiver in communication with the optical throughput bus.

24. The device of claim 16, further comprising a tuning apparatus configured to tune the optical ring resonator.

25. The device of claim 24, wherein the tuning apparatus configured to tune the physical properties of optical ring resonator.

26. The device of claim 24, wherein the tuning apparatus is configured to control a temperature of the optical ring resonator, the tuning apparatus comprising one or more of: a temperature control apparatus, a heater, a cooler, and a thermoelectric cooler.

27. A device comprising:
an optical input device; an optical output device;
an optical throughput bus configured to convey a plurality of optical input signals of different given respective optical carrier frequencies, and each having a given respective data rate, from the optical input device to the optical output device; and,
a plurality of pairs of optical ring resonators on the optical throughput bus, each of the plurality of pairs of optical ring resonators tuned to a different optical carrier frequency, each of the plurality of pairs of optical rinq resonators configured to filter given respective optical input signal from the optical input device to produce a respective optical output signal that is conveyed by the optical throughput bus to the optical output device, each of the plurality of pairs of optical ring resonators comprising: a first optical ring resonator and a second optical ring resonator, each coupled to the optical throughout bus, respective coupling of each of the first optical ring resonator and the second optical ring resonator to the optical throughput bus, and respective physical properties thereof, selected so that:
- a combined dispersion compensation of the first optical ring resonator and the second optical ring resonator is at a given respective dispersion value at the given respective optical carrier frequency;
- respective insertion loss profiles for each of the of the first optical rinq resonator and the second optical ring resonator have respective maximum peaks on opposite sides of the given respective optical carrier frequency; and,
- a centre of a combined insertion loss profile of the first optical ring resonator and the second optical ring resonator is between the given respective optical carrier frequency and a first minimum of a given respective optical input signal, the combined insertion loss profile having a bandwidth at least about two thirds of the given respective data rate, so that a side band of the given respective optical input signal dominates the respective optical output signal conveyed along the optical throughput bus;
- a centre of an insertion loss profile of the optical ring resonance structure is between the given optical carrier frequency and a first minimum of the given optical input signal, the insertion loss profile having a bandwidth at least about two thirds of the given data rate, so that a side band of the given optical input signal dominates an optical output signal conveyed from the optical input bus to the optical output bus.

28. The device of claim 27, wherein the respective physical properties of each of the plurality of pairs of optical ring resonators are further selected so that the combined dispersion compensation between either: about 50 ps/nm and to about 300 ps/nm; or about −50 ps/nm and to about −300 ps/nm.

29. The device of claim 27, wherein the respective physical properties of each of the plurality of pairs of optical ring resonators are further selected so that a total insertion loss due to the combined insertion loss profile is between about 4 dB and about 8 dB.

30. The device of claim 27, wherein the optical input device is configured to receive an optical fiber, the optical fiber configured to convey the plurality of optical input signals to the optical throughput bus.

31. The device of claim 27, wherein the optical output device is configured to convey optical output signals to one or more of: an optical fiber and an optical receiver.

32. The device of claim 27, further comprising an optical receiver in communication with the optical throughput bus.

33. The device of claim 27, further comprising at least one tuning apparatus configured to independently tune each of the plurality of pairs of optical ring resonators.

34. The device of claim 33, wherein the at least one tuning apparatus configured to independently tune respective physical properties of each of the plurality of pairs of optical ring resonators.

35. The device of claim 33, wherein the at least one tuning apparatus is configured to independently control a temperature of each of the plurality of pairs of optical ring resonators, the at least one tuning apparatus comprising, for each optical resonator in each of the plurality of pairs of optical ring resonators, one or more of: at least one temperature control apparatus, at least one heater, at least one cooler, at least one thermoelectric cooler.

36. The device of claim 33, further comprising a first tuning apparatus configured to tune the first optical ring resonator independent from the second optical ring resonator, and a second tuning apparatus configured to tune the second optical ring resonator independent from the first optical ring resonator.

\* \* \* \* \*